United States Patent
Wu

(10) Patent No.: US 9,577,958 B2
(45) Date of Patent: *Feb. 21, 2017

(54) METHOD AND APPARATUS FOR IMPLEMENTING COMMUNICATION BETWEEN VIRTUAL MACHINES

(71) Applicant: HUAWEI TECHNOLOGIES CO., LTD., Shenzhen, Guangdong (CN)

(72) Inventor: Tianyi Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,524

(22) Filed: Mar. 31, 2016

(65) Prior Publication Data

US 2016/0212067 A1 Jul. 21, 2016

Related U.S. Application Data

(63) Continuation of application No. 14/738,341, filed on Jun. 12, 2015, now Pat. No. 9,325,615, which is a (Continued)

(30) Foreign Application Priority Data

Dec. 31, 2013 (WO) ................ PCT/CN2013/091202

(51) Int. Cl.
*H04L 12/46* (2006.01)
*H04L 12/749* (2013.01)
(Continued)

(52) U.S. Cl.
CPC .............. *H04L 49/25* (2013.01); *G06F 9/455* (2013.01); *G06F 13/4004* (2013.01);
(Continued)

(58) Field of Classification Search
CPC .......... H04L 12/4641–12/4695; H04L 61/103; H04L 29/12028
See application file for complete search history.

(56) References Cited

U.S. PATENT DOCUMENTS 8,259,726 B2 9/2012 Subramanian et al.
9,325,615 B2 * 4/2016 Wu ...................... H04L 61/103
(Continued)

FOREIGN PATENT DOCUMENTS

CN 101617515 A 12/2009
CN 102457583 A 5/2012
(Continued)

OTHER PUBLICATIONS

"Double datacenter solutions", from Cisco, 2012. total 4 pages.
(Continued)

*Primary Examiner* — Hoon J Chung
(74) *Attorney, Agent, or Firm* — Huawei Technologies Co., Ltd.

(57) ABSTRACT

In a method and an apparatus provided for implementing communication between virtual machines, a first switch receives an ARP response from an SDN controller, where the ARP response carries a MAC address of a destination gateway; the first switch acquires, according to the MAC address of the destination gateway, VTEP information corresponding to the MAC address of the destination gateway, where a router corresponding to the VTEP information is located in a first data center; and the first switch sends, according to the VTEP information, an IP packet to the router corresponding to the VTEP information, so that the router corresponding to the VTEP information sends the IP packet to a second virtual machine through a tunnel between the router and a second switch.

17 Claims, 14 Drawing Sheets

Related U.S. Application Data continuation of application No. PCT/CN2014/079949, filed on Jun. 16, 2014.

(51) Int. Cl.
*H04L 12/947* (2013.01)
*H04L 12/741* (2013.01)
*H04L 12/931* (2013.01)
*H04L 29/12* (2006.01)
*H04L 12/771* (2013.01)
*G06F 13/40* (2006.01)
*G06F 9/455* (2006.01)

(52) U.S. Cl.
CPC ...... *H04L 12/4633* (2013.01); *H04L 12/4641* (2013.01); *H04L 45/56* (2013.01); *H04L 45/74* (2013.01); *H04L 45/745* (2013.01); *H04L 49/354* (2013.01); *H04L 61/103* (2013.01); *H04L 61/2557* (2013.01)

(56) References Cited

U.S. PATENT DOCUMENTS

| | | |
|---|---|---|
| 2010/0061386 A1 | 3/2010 | Olsson et al. |
| 2011/0019676 A1 | 1/2011 | Portolani et al. |
| 2012/0099602 A1 | 4/2012 | Nagapudi et al. |
| 2013/0142203 A1 | 6/2013 | Koponen et al. |
| 2013/0223277 A1 | 8/2013 | Decusatis et al. |
| 2013/0232492 A1 | 9/2013 | Wang et al. |
| 2013/0266015 A1 | 10/2013 | Qu et al. |
| 2013/0266019 A1 | 10/2013 | Qu et al. |
| 2013/0318219 A1 | 11/2013 | Kancherla et al. |
| 2013/0322443 A1 | 12/2013 | Dunbar et al. |
| 2014/0019639 A1 | 1/2014 | Ueno |
| 2014/0369345 A1 | 12/2014 | Yang et al. |

FOREIGN PATENT DOCUMENTS

| | | |
|---|---|---|
| CN | 102801715 A | 11/2012 |
| CN | 102857416 A | 1/2013 |
| CN | 103460653 A | 12/2013 |
| CN | 103647853 A | 3/2014 |
| EP | 2618535 A1 | 7/2013 |
| WO | 2008077423 A1 | 7/2008 |
| WO | 2012133290 A1 | 10/2012 |

OTHER PUBLICATIONS

Overlay Transport Virtualization Best Practices Guide, Configuration Guide, Oct. 2013, total 26 pages.

Chao Zhang, Ultra large scale testing and verification of CISCO Cloud Computing Solutions Framework, (CISCO systems (China) Network Technology Co., Ltd.) Jul. 2013. total 28 pages.

Yukihiro Nakagawa, Kazuki Hyoudou and Takeshi Shimizu, A Management Method of IP Multicast in Overlay Networks using OpenFlow, Proceedings of the first workshop on Hot topics in software defined networks, ACM, 2012, pp. 91-96. total 6 pages.

The first office action of Family Application JP2015560542, Mailing Date: Aug. 9, 2016, total 4 pages.

The first office action of Family Application JP2015560542, Mailing Date: Aug. 9, 2016, English translation. total 4 pages.

Nao Tamura, The world's most comprehensible story of SDN, automatically configuring a network by software, NIKKEI NETWORK, Issue 157, NIKKEI BP Publication, Inc., Apr. 28, 2013, pp. 42-47. total 9 pages. with English translation.

Tatsuya Baba, Starting "Network Virtualization" from now on (No. 3), NIKKEI Computer, No. 821, NIKKEI BP Publication, Inc., Nov. 8, 2012, pp. 102-105. total 7 pages. with English translation.

\* cited by examiner

METHOD AND APPARATUS FOR IMPLEMENTING COMMUNICATION BETWEEN VIRTUAL MACHINES

CROSS-REFERENCE TO RELATED APPLICATIONS

This application is a continuation of U.S. patent application Ser. No. 14/738,341 filed on Jun. 12, 2015, which is a continuation of International Application No. PCT/CN2014/079949, filed on Jun. 16, 2014, which claims priority to Application No. PCT/CN2013/091202, filed on Dec. 31, 2013, all of which are hereby incorporated by reference in their entireties.

TECHNICAL FIELD

Embodiments of the present invention relate to the field of network communication, and in particular, to a method and an apparatus for implementing communication between virtual machines.

BACKGROUND

In the prior art, a virtual extensible local area network (VxLAN) technology is used to extend network virtualization so as to obtain a sufficient quantity of virtual networks for users.

Virtual machines (VM) of multiple virtual networks may run in each data center. When communicating with a VM of another data center, a VM of a data center may send a broadcast Address Resolution Protocol (ARP) request to a first-hop router to acquire a MAC address of a destination gateway in a broadcast manner, and the ARP request is then broadcast to each VM. After the MAC address of the destination gateway is acquired, a packet is sent to a router of each data center by using the MAC address of the destination gateway, and then arrives at a destination VM, thereby implementing communication between the VMs. However, in this manner of ARP broadcasting to each VM, a large amount of transmission bandwidth is occupied; in addition, a packet can arrive at a destination VM only by passing through the router of each data center, which results in serious roundabout routing among data centers.

SUMMARY

Embodiments of the present invention propose a method and an apparatus for implementing communication between virtual machines, so as to reduce transmission bandwidth occupied by packet broadcasting, and alleviate roundabout routing of a packet among data centers.

According to a first aspect, an embodiment of the present invention proposes a method for implementing communication between virtual machines, applied to a system including at least a first virtual machine and a second virtual machine, where the first virtual machine is located in a first subnet of a first data center and communicates with a first switch, the second virtual machine is located in a second subnet and communicates with a second switch, and the first switch may be the same as or may be different from the second switch. The method includes: receiving, by the first switch, an Address Resolution Protocol (ARP) request from the first virtual machine, where the ARP request carries an IP address of a destination gateway; forwarding, by the first switch, the ARP request to a software defined network (SDN) controller of the first data center; receiving, by the first switch, an ARP response from the SDN controller, where the ARP response carries a Media Access Control (MAC) address of the destination gateway; acquiring, by the first switch according to the MAC address of the destination gateway, virtual extensible local area network tunnel end point (VTEP) information corresponding to the MAC address of the destination gateway, where a router corresponding to the VTEP information is located in the first data center; and sending, by the first switch according to the VTEP information, an IP packet to the router corresponding to the VTEP information, so that the router corresponding to the VTEP information sends the IP packet to the second virtual machine through a tunnel between the router and the second switch.

With reference to the first aspect, in a first possible implementation manner, the acquiring, by the first switch according to the MAC address of the destination gateway, VTEP information corresponding to the MAC address of the destination gateway specifically includes: sending, by the first switch, a request to the SDN controller to request to acquire the VTEP information corresponding to the MAC address of the destination gateway; and receiving the VTEP information that is sent by the SDN controller and is corresponding to the MAC address of the destination gateway.

With reference to the first aspect, in a second possible implementation manner, the acquiring, by the first switch according to the MAC address of the destination gateway, VTEP information corresponding to the MAC address of the destination gateway specifically includes: querying, by the first switch, a locally stored flow table according to the MAC address of the destination gateway, and acquiring the VTEP information corresponding to the MAC address of the destination gateway.

With reference to the second possible implementation manner of the first aspect, in a third possible implementation manner, the querying, by the first switch, a locally stored flow table, and acquiring the VTEP information corresponding to the MAC address of the destination gateway specifically includes:

when the first switch queries the locally stored flow table according to the MAC address of the destination gateway and acquires two or more pieces of VTEP information, using VTEP information of the router located in the first data center as the VTEP information corresponding to the MAC address of the destination gateway.

With reference to the third possible implementation manner of the first aspect, in a fourth possible implementation manner, when the first switch queries the locally stored flow table according to the MAC address of the destination gateway and acquires two or more pieces of VTEP information of routers located in the first data center, the first switch selects the VTEP information corresponding to the MAC address of the destination gateway according to at least one of the following: load of a router and a scheduling policy.

With reference to the first aspect, or any one of the first to fourth possible implementation manners of the first aspect, in a fifth possible implementation manner, the sending, by the first switch according to the VTEP information, an IP packet to the router corresponding to the VTEP information, so that the router corresponding to the VTEP information sends the IP packet to the second virtual machine through a tunnel between the router and the second switch specifically includes:

performing, by the first switch, virtual extensible local area network (VxLAN) encapsulation on an IP packet received from the first virtual machine, where a destination IP address of the VxLAN encapsulation is the acquired VTEP information, a virtual network identifier (VNI) is an identifier of the first subnet, and a destination MAC address of the IP packet is the MAC address of the destination gateway;

changing, by the router corresponding to the VTEP information, the destination IP address to an IP address of the second switch, the VNI to an identifier of the second subnet, and the destination MAC address to a MAC address of the second virtual machine; and sending, to the second switch, the IP packet whose VxLAN encapsulation is changed; and after the second switch performs VxLAN decapsulation on the received IP packet whose VxLAN encapsulation is changed, sending the IP packet to the second virtual machine.

According to a second aspect, an embodiment of the present invention proposes a method for implementing communication between virtual machines, applied to a system including at least a first virtual machine and a second virtual machine, where the first virtual machine is located in a first subnet of a first data center and communicates with a first switch, the second virtual machine is located in a second subnet and communicates with a second switch, and the first switch may be the same as or may be different from the second switch. The method includes: receiving, by a software defined network (SDN) controller of the first data center, an Address Resolution Protocol (ARP) request from the first switch, where the ARP request carries an IP address of a destination gateway; acquiring, by the SDN controller, a Media Access Control (MAC) address of the destination gateway according to the IP address of the destination gateway; and sending an ARP response to the first switch, where the ARP response carries the MAC address of the destination gateway, so that the first switch acquires, according to the MAC address of the destination gateway, virtual extensible local area network tunnel end point (VTEP) information corresponding to the MAC address of the destination gateway, where a router corresponding to the VTEP information is located in the first data center, so that the router corresponding to the VTEP information sends an IP packet to the second virtual machine through a tunnel between the router and the second switch.

With reference to the second aspect, in a first possible implementation manner, the SDN controller receives a request sent by the first switch to request to acquire the VTEP information corresponding to the MAC address of the destination gateway; and the SDN controller queries a locally stored flow table according to the MAC address of the destination gateway, acquires the VTEP information corresponding to the MAC address of the destination gateway, and returns the VTEP information corresponding to the MAC address of the destination gateway to the first switch.

With reference to the first possible implementation manner of the second aspect, in a second possible implementation manner, the querying, by the SDN controller, a locally stored flow table and acquiring the VTEP information corresponding to the MAC address of the destination gateway specifically includes:

when the SDN controller queries the locally stored flow table according to the MAC address of the destination gateway and acquires two or more pieces of VTEP information, using VTEP information of the router located in the first data center as the VTEP information corresponding to the MAC address of the destination gateway.

With reference to the second possible implementation manner of the second aspect, in a third possible implementation manner, when the SDN controller queries the locally stored flow table according to the MAC address of the destination gateway and acquires two or more pieces of VTEP information of routers located in the first data center, the SDN controller selects the VTEP information corresponding to the MAC address of the destination gateway according to at least one of the following: load of a router and a scheduling policy.

With reference to the second aspect, or any one of the first to third possible implementation manners of the second aspect, in a fourth possible implementation manner, if the second virtual machine is located in a second data center, the method further includes:

acquiring, by the SDN controller of the first data center from an SDN controller of the second data center, an IP address and a MAC address of the second virtual machine, a virtual network identifier (VNI) of the second subnet, and VTEP information of the second switch, so that under control of the SDN controller of the first data center, the router corresponding to the VTEP information sends the IP packet to the second virtual machine through the tunnel between the router and the second switch.

According to a third aspect, an embodiment of the present invention proposes a first switch for implementing communication between virtual machines, applied to a system including at least a first virtual machine and a second virtual machine, where the first virtual machine is located in a first subnet of a first data center and communicates with the first switch, the second virtual machine is located in a second subnet and communicates with a second switch, and the first switch may be the same as or may be different from the second switch. The first switch includes: a receiving module, configured to receive an Address Resolution Protocol (ARP) request from the first virtual machine, where the ARP request carries an IP address of a destination gateway;

a sending module, configured to forward the ARP request to a software defined network (SDN) controller of the first data center, where the receiving module is further configured to receive an ARP response from the SDN controller, where the ARP response carries a Media Access Control (MAC) address of the destination gateway; and an acquiring module, configured to acquire, according to the MAC address of the destination gateway, virtual extensible local area network tunnel end point (VTEP) information corresponding to the MAC address of the destination gateway, where a router corresponding to the VTEP information is located in the first data center, where the sending module is further configured to send, according to the VTEP information, an IP packet to the router corresponding to the VTEP information, so that the router corresponding to the VTEP information sends the IP packet to the second virtual machine through a tunnel between the router and the second switch.

With reference to the third aspect, in a first possible implementation manner, the acquiring module being configured to acquire, according to the MAC address of the destination gateway, VTEP information corresponding to the MAC address of the destination gateway is specifically that:

the acquiring module is configured to send a request to the SDN controller to request to acquire the VTEP information corresponding to the MAC address of the destination gateway, and receive the VTEP information that is sent by the SDN controller and is corresponding to the MAC address of the destination gateway.

With reference to the third aspect, in a second possible implementation manner, the acquiring module being configured to acquire, according to the MAC address of the destination gateway, VTEP information corresponding to the MAC address of the destination gateway is specifically that:

the acquiring module is being configured to query, according to the MAC address of the destination gateway, a flow table stored by the first switch, and acquire the VTEP information corresponding to the MAC address of the destination gateway.

With reference to the second possible implementation manner of the third aspect, in a third possible implementation manner, that the acquiring module is configured to query a flow table stored by the first switch, and acquire the VTEP information corresponding to the MAC address of the destination gateway is specifically that:

the acquiring module is configured to: when querying, according to the MAC address of the destination gateway, the flow table stored by the first switch and acquiring two or more pieces of VTEP information, use VTEP information of the router located in the first data center as the VTEP information corresponding to the MAC address of the destination gateway.

According to a fourth aspect, an embodiment of the present invention proposes a software defined network (SDN) controller for implementing communication between virtual machines, where the SDN controller is located in a first data center and applied to a system including at least a first virtual machine and a second virtual machine, where the first virtual machine is located in a first subnet of the first data center and communicates with a first switch, the second virtual machine is located in a second subnet and communicates with a second switch, and the first switch may be the same as or may be different from the second switch. The SDN controller includes:

a receiving module, configured to receive an Address Resolution Protocol (ARP) request from the first switch, where the ARP request carries an IP address of a destination gateway;

a processing module, configured to acquire a Media Access Control (MAC) address of the destination gateway according to the IP address of the destination gateway; and a sending module, configured to send an ARP response to the first switch, where the ARP response carries the MAC address of the destination gateway, so that the first switch acquires, according to the MAC address of the destination gateway, virtual extensible local area network tunnel end point (VTEP) information corresponding to the MAC address of the destination gateway, where a router corresponding to the VTEP information is located in the first data center, so that the router corresponding to the VTEP information sends an IP packet to the second virtual machine through a tunnel between the router and the second switch.

With reference to the fourth aspect, in a first possible implementation manner, the receiving module is further configured to receive a request sent by the first switch to request to acquire the VTEP information corresponding to the MAC address of the destination gateway; and the processing module is further configured to query, according to the MAC address of the destination gateway, a flow table stored by the SDN controller, acquire the VTEP information corresponding to the MAC address of the destination gateway, and return the VTEP information corresponding to the MAC address of the destination gateway to the first switch.

With reference to the first possible implementation manner of the fourth aspect, in a second possible implementation manner, that the processing module is configured to query a flow table stored by the SDN controller and acquire the VTEP information corresponding to the MAC address of the destination gateway is specifically that:

the processing module is configured to: when querying, according to the MAC address of the destination gateway, the flow table stored by the SDN controller and acquiring two or more pieces of VTEP information, use VTEP information of the router located in the first data center as the VTEP information corresponding to the MAC address of the destination gateway.

With reference to the second possible implementation manner of the fourth aspect, in a third possible implementation manner, when the processing module is configured to query, according to the MAC address of the destination gateway, the flow table stored by the SDN controller and acquire two or more pieces of VTEP information of routers located in the first data center, the processing module is configured to select the VTEP information corresponding to the MAC address of the destination gateway according to at least one of the following: load of a router and a scheduling policy.

With reference to the fourth aspect, or any one of the first to third possible implementation manners of the fourth aspect, in a fourth possible implementation manner, if the second virtual machine is located in a second data center, the processing module is further configured to acquire, from an SDN controller of the second data center, an IP address and a MAC address of the second virtual machine, a virtual network identifier (VNI) of the second subnet, and VTEP information of the second switch.

According to a fifth aspect, an embodiment of the present invention proposes a switch for implementing communication between virtual machines, including:

a processor, a memory, and a system bus, where: the processor and the memory are connected and complete communication with each other by using the system bus;

the memory is configured to store a computer-executable instruction; and the processor is configured to run the computer-executable instruction to execute the method according to the first aspect or any one of the first to fifth possible implementation manners of the first aspect.

According to a sixth aspect, an embodiment of the present invention proposes a software defined network SDN controller for implementing communication between virtual machines, including: a processor, a memory, and a system bus, where: the processor and the memory are connected and complete communication with each other by using the system bus;

the memory is configured to store a computer-executable instruction; and the processor is configured to run the computer-executable instruction to execute the method according to the second aspect or any one of the first to fourth possible implementation manners of the second aspect.

In the embodiments of the present invention, a first switch receives an ARP response from an SDN controller, where the ARP response carries a MAC address of a destination gateway; the first switch acquires, according to the MAC address of the destination gateway, VTEP information corresponding to the MAC address of the destination gateway, where a router corresponding to the VTEP information is located in a first data center; and the first switch sends, according to the VTEP information, an IP packet to the router corresponding to the VTEP information, so that the router corresponding to the VTEP information sends the IP packet to a second virtual machine through a tunnel between the router and a second switch. Therefore, an SDN controller serves as a proxy, which reduces transmission bandwidth occupied by packet broadcasting; in addition, unlike the prior art in which a packet may pass through both a router of a first data center and a router of a second data center, a packet passes only through a router of a first data center, which alleviates roundabout routing of the packet among data centers.

According to a seventh aspect, an embodiment of the present invention proposes a method for implementing communication between virtual machines, applied to a system including at least a first virtual machine and a second virtual machine, where the first virtual machine is located in a first data center and communicates with a first switch, the second virtual machine is located in a second data center and communicates with a second switch, the first virtual machine and the second virtual machine are located in a same subnet, and the first switch may be the same as or may be different from the second switch. The method includes: receiving, by the first switch, an Address Resolution Protocol (ARP) request from the first virtual machine, where the ARP request carries an IP address of a destination virtual machine; acquiring, by the first switch, a Media Access Control (MAC) address of the destination virtual machine according to the IP address of the destination virtual machine; acquiring, according to the MAC address of the destination virtual machine, virtual extensible local area network tunnel end point (VTEP) information corresponding to the MAC address of the destination virtual machine, where the VTEP information is an IP address of the second switch; and sending, by the first switch, an IP packet to the second virtual machine through a tunnel between the first switch and the second switch.

With reference to the seventh aspect, in a first possible implementation manner, the acquiring, by the first switch, a Media Access Control (MAC) address of the destination virtual machine according to the IP address of the destination virtual machine specifically includes: forwarding, by the first switch, the ARP request to a software defined network (SDN) controller of the first data center, where the ARP request carries the IP address of the destination virtual machine; and receiving, by the first switch, an ARP response from the SDN controller, where the ARP response carries the MAC address of the destination virtual machine.

With reference to the seventh aspect or the first possible implementation manner of the seventh aspect, in a second possible implementation manner, the acquiring, according to the MAC address of the destination virtual machine, VTEP information corresponding to the MAC address of the destination virtual machine specifically includes:

sending, by the first switch, a request to the SDN controller to request to acquire the VTEP information corresponding to the MAC address of the destination virtual machine; and receiving the VTEP information that is sent by the SDN controller and is corresponding to the MAC address of the destination virtual machine.

With reference to the seventh aspect or the first possible implementation manner of the seventh aspect, in a third possible implementation manner, the acquiring, according to the MAC address of the destination virtual machine, VTEP information corresponding to the MAC address of the destination virtual machine specifically includes:

querying, by the first switch, a locally stored flow table according to the MAC address of the destination virtual machine, and acquiring the VTEP information corresponding to the MAC address of the destination virtual machine.

With reference to the third possible implementation manner of the seventh aspect, in a fourth possible implementation manner, the first switch acquires, from the SDN controller, an IP address and a MAC address of the second virtual machine, and VTEP information of the second switch, so as to send the IP packet to the second virtual machine through the tunnel between the first switch and the second switch.

According to an eighth aspect, an embodiment of the present invention proposes a method for implementing communication between virtual machines, applied to a system including at least a first virtual machine and a second virtual machine, where the first virtual machine is located in a first data center and communicates with a first switch, the second virtual machine is located in a second data center and communicates with a second switch, the first virtual machine and the second virtual machine are located in a same subnet, and the first switch may be the same as or may be different from the second switch. The method includes: receiving, by a software defined network (SDN) controller of the first data center, an Address Resolution Protocol (ARP) request from the first switch, where the ARP request carries an IP address of a destination virtual machine; and acquiring, by the SDN controller, a Media Access Control (MAC) address of the destination virtual machine according to the IP address of the destination virtual machine; and sending an ARP response to the first switch, where the ARP response carries the MAC address of the destination virtual machine, so that the first switch acquires, according to the MAC address of the destination virtual machine, virtual extensible local area network tunnel end point (VTEP) information corresponding to the MAC address of the destination virtual machine, where the VTEP information is an IP address of the second switch, so that the first switch sends an IP packet to the second virtual machine through a tunnel between the first switch and the second switch.

With reference to the eighth aspect, in a first possible implementation manner, the SDN controller receives a request sent by the first switch to request to acquire the VTEP information corresponding to the MAC address of the destination virtual machine; and the SDN controller queries a locally stored flow table according to the MAC address of the destination virtual machine, acquires the VTEP information corresponding to the MAC address of the destination virtual machine, and returns the VTEP information corresponding to the MAC address of the destination virtual machine to the first switch.

With reference to the eighth aspect or the first possible implementation manner of the eighth aspect, in a second possible implementation manner, the SDN controller of the first data center acquires, from an SDN controller of the second data center, an IP address and a MAC address of the second virtual machine, and VTEP information of the second switch; and sends the IP address and the MAC address of the second virtual machine, and the VTEP information of the second switch to the first switch.

According to a ninth aspect, an embodiment of the present invention proposes a first switch for implementing communication between virtual machines, applied to a system including at least a first virtual machine and a second virtual machine, where the first virtual machine is located in a first data center and communicates with the first switch, the second virtual machine is located in a second data center and communicates with a second switch, the first virtual machine and the second virtual machine are located in a same subnet, and the first switch may be the same as or may be different from the second switch. The switch includes:

a receiving module, configured to receive an Address Resolution Protocol (ARP) request from the first virtual machine, where the ARP request carries an IP address of a destination virtual machine;

a processing module, configured to acquire a Media Access Control (MAC) address of the destination virtual machine according to the IP address of the destination virtual machine, and acquire, according to the MAC address of the destination virtual machine, virtual extensible local area network tunnel end point (VTEP) information corresponding to the MAC address of the destination virtual machine, where the VTEP information is an IP address of the second switch; and a sending module, configured to send an IP packet to the second virtual machine through a tunnel between the first switch and the second switch.

With reference to the ninth aspect, in a first possible implementation manner, the processing module being configured to acquire a MAC address of the destination virtual machine according to the IP address of the destination virtual machine is specifically that:

the processing module is configured to: forward the ARP request to a software defined network (SDN) controller of the first data center, where the ARP request carries the IP address of the destination virtual machine; and receive an ARP response from the SDN controller, where the ARP response carries the MAC address of the destination virtual machine.

With reference to the ninth aspect or the first possible implementation manner of the ninth aspect, in a second possible implementation manner, the processing module being configured to acquire, according to the MAC address of the destination virtual machine, VTEP information corresponding to the MAC address of the destination virtual machine is specifically that:

the processing module is configured to send a request to the SDN controller to request to acquire the VTEP information corresponding to the MAC address of the destination virtual machine, and receive the VTEP information that is sent by the SDN controller and is corresponding to the MAC address of the destination virtual machine.

With reference to the ninth aspect or the first possible implementation manner of the ninth aspect, in a third possible implementation manner, the processing module being configured to acquire, according to the MAC address of the destination virtual machine, VTEP information corresponding to the MAC address of the destination virtual machine is specifically that:

the processing module is configured to query, according to the MAC address of the destination virtual machine, a flow table stored by the first switch, and acquire the VTEP information corresponding to the MAC address of the destination virtual machine.

With reference to the third possible implementation manner of the ninth aspect, in a fourth possible implementation manner, the processing module is further configured to acquire, from the SDN controller of the first data center, an IP address and a MAC address of the second virtual machine, and VTEP information of the second switch.

According to a tenth aspect, an embodiment of the present invention proposes a software defined network (SDN) controller for implementing communication between virtual machines, where the SDN controller is located in a first data center and applied to a system including at least a first virtual machine and a second virtual machine, where the first virtual machine is located in the first data center and communicates with a first switch, the second virtual machine is located in a second data center and communicates with a second switch, the first virtual machine and the second virtual machine are located in a same subnet, and the first switch may be the same as or may be different from the second switch. The SDN controller includes:

a receiving module, configured to receive an Address Resolution Protocol (ARP) request from the first switch, where the ARP request carries an IP address of a destination virtual machine;

an acquiring module, configured to acquire a Media Access Control (MAC) address of the destination virtual machine according to the IP address of the destination virtual machine; and a sending module, configured to send an ARP response to the first switch, where the ARP response carries the MAC address of the destination virtual machine, so that the first switch acquires, according to the MAC address of the destination virtual machine, virtual extensible local area network tunnel end point (VTEP) information corresponding to the MAC address of the destination virtual machine, where the VTEP information is an IP address of the second switch, so that the first switch sends an IP packet to the second virtual machine through a tunnel between the first switch and the second switch.

With reference to the tenth aspect, in a first possible implementation manner, the receiving module is further configured to receive a request sent by the first switch to request to acquire the VTEP information corresponding to the MAC address of the destination virtual machine; and the acquiring module is further configured to query, according to the MAC address of the destination virtual machine, a flow table stored by the SDN controller, acquire the VTEP information corresponding to the MAC address of the destination virtual machine, and return the VTEP information corresponding to the MAC address of the destination virtual machine to the first switch.

With reference to the tenth aspect or the first possible implementation manner of the tenth aspect, in a second possible implementation manner, the acquiring module is further configured to acquire, from an SDN controller of the second data center, an IP address and a MAC address of the second virtual machine, and VTEP information of the second switch; and the sending module is further configured to send the IP address and the MAC address of the second virtual machine, and the VTEP information of the second switch to the first switch.

According to an eleventh aspect, an embodiment of the present invention proposes a switch for implementing communication between virtual machines, including:

a processor, a memory, and a system bus, where: the processor and the memory are connected and complete communication with each other by using the system bus;

the memory is configured to store a computer-executable instruction; and the processor is configured to run the computer-executable instruction to execute the method according to the seventh aspect or any one of the first to fourth possible implementation manners of the seventh aspect.

According to a twelfth aspect, an embodiment of the present invention proposes a software defined network SDN controller for implementing communication between virtual machines, including: a processor, a memory, and a system bus, where: the processor and the memory are connected and complete communication with each other by using the system bus;

the memory is configured to store a computer-executable instruction; and the processor is configured to run the computer-executable instruction to execute the method according to the eighth aspect or any one of the first to second possible implementation manners of the eighth aspect.

In the embodiments of the present invention, a first switch acquires a MAC address of a destination virtual machine according to an IP address of the destination virtual machine, and acquires, according to the MAC address of the destination virtual machine, VTEP information corresponding to the MAC address of the destination virtual machine, where the VTEP information is an IP address of a second switch; and the first switch sends an IP packet to a second virtual machine through a tunnel between the first switch and the second switch. Therefore, an SDN controller serves as a proxy, which reduces transmission bandwidth occupied by packet broadcasting; a packet does not need to pass through a router of a first data center and does not need to pass through a router of a second data center either, which alleviates roundabout routing of the packet between the two data centers.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of embodiments of the present invention clearer, the following clearly describes the technical solutions of the embodiments of the present invention with reference to the accompanying drawings in the embodiments of the present invention.

The embodiments of the present invention propose a method and a system for implementing communication between virtual machines, which can reduce transmission bandwidth occupied by packet broadcasting, and alleviate roundabout routing of a packet among data centers.

System Architecture in Embodiments of the Present Invention

Figure 1A:
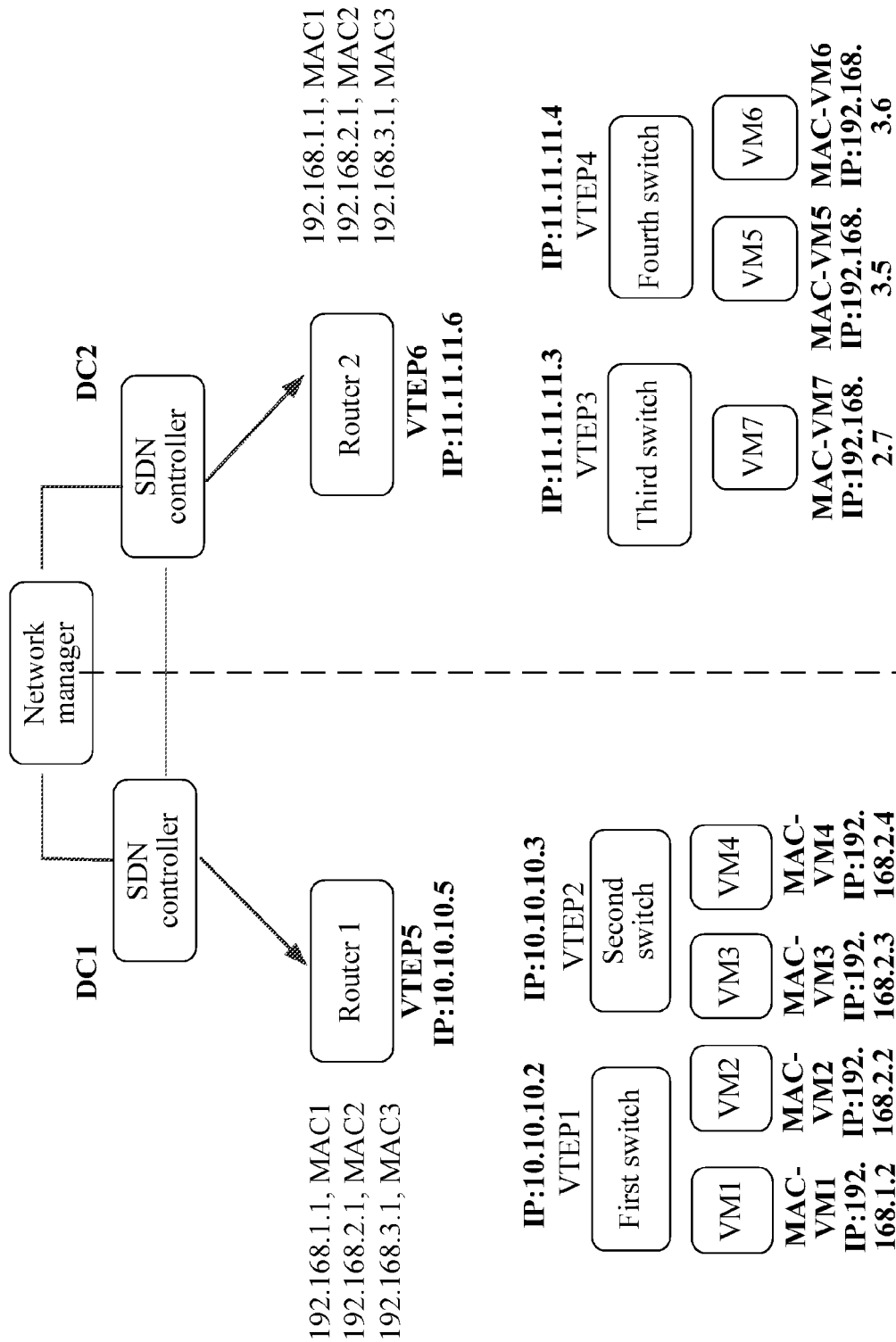
FIG. 1a is an architectural diagram of a system for implementing communication between virtual machines according to an embodiment of the present invention.
Figure 1B:
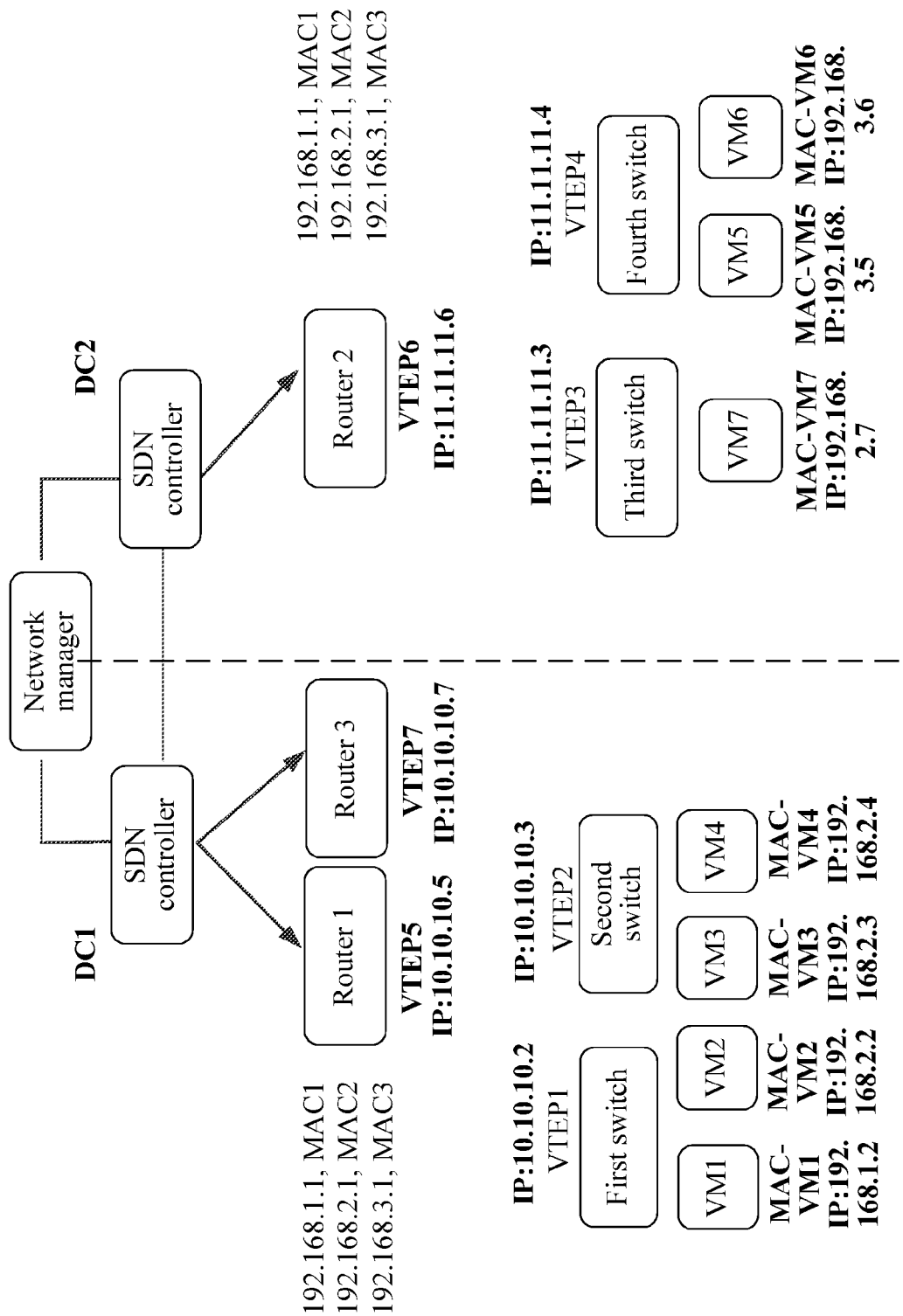
FIG. 1b is an architectural diagram of a system for implementing communication between virtual machines according to an embodiment of the present invention.

The method for implementing communication between virtual machines according to an embodiment of the present invention may be implemented in system architectures shown in FIG. 1a and FIG. 1b. FIG. 1a and FIG. 1b are merely exemplary illustration, and do not impose limitation on a specific networking manner.

A virtual extensible local area network (VxLAN) implements network virtualization by performing encapsulation on a layer 3 network. Specifically, VxLAN encapsulation is completed by using a VxLAN tunnel end point (VTEP). The end point may be provided by a hypervisor switch or a physical access switch. A tunnel (Tunnel) is established between VTEPs, and data of a virtual network is transmitted through the tunnel As shown in FIG. 1a, a system includes a first data center (DC1) and a second data center (DC2). DC1 includes virtual machines (VM) VM1, VM2, VM3, and VM4; DC2 includes virtual machines VM5, VM6, and VM7.

A network manager (NetworkManager) is deployed in any data center, and can implement communication with a software defined network controller (SDN Controller) of each data center. For a function of the network manager, specifically refer to descriptions of FIG. 2 and FIG. 3.

One SDN controller may be separately deployed in each data center, and the SDN controllers of the data centers communicate with each other, where specifically, SDN controller clusters may be interconnected in a Full-Mesh manner, or may be partially connected, and it may also be that one SDN controller is deployed in multiple data centers, which is not limited in the present invention.

VM1 located in DC1 belongs to a first subnet (which may also be represented by subnet 1), and a virtual network identifier (VNI) of the subnet uses 11111 as an example. An IP address of a gateway of the first subnet in DC1 uses 192.168.1.1 as an example, and a Media Access Control (MAC) address of the gateway of the first subnet in DC1 is MAC1. An IP address of a gateway of the first subnet in DC2 uses 192.168.1.1 as an example, and a MAC address of the gateway of the first subnet in DC2 is MAC1. The IP address of the gateway of the first subnet in DC1 may be the same as or different from the IP address of the gateway of the first subnet in DC2. The MAC address of the gateway of the first subnet in DC1 may be the same as or different from the MAC address of the gateway of the first subnet in DC2. In a case in which the IP addresses and the MAC addresses are the same (which may also be referred to as dual activation), this solution has a more significant effect.

VM1 communicates with a VM outside the first subnet by using a first switch (Switch), where the switch herein may be virtual, or may be physical, which is not limited in the present invention. An IP address of the first switch uses 10.10.10.2 as an example, and the first switch is represented by VTEP1 in a tunnel An IP address of VM1 uses 192.168.1.2 as an example, and a MAC address of VM1 is represented by MAC-VM1.

VM2, VM3, and VM4 located in DC1 and VM7 located in DC2 belong to a same subnet, which is referred to as a second subnet (which may also be represented by subnet 2), and a VNI of the subnet uses 22222 as an example. An IP address of a gateway of the second subnet in DC1 uses 192.168.2.1 as an example, and a MAC address of the gateway of the second subnet in DC1 is MAC2. An IP address of a gateway of the second subnet in DC2 uses 192.168.2.1 as an example, and a MAC address of the gateway of the second subnet in DC2 is MAC2. The IP address of the gateway of the second subnet in DC1 may be the same as or different from the IP address of the gateway of the second subnet in DC2. The MAC address of the gateway of the second subnet in DC1 may be the same as or different from the MAC address of the gateway of the second subnet in DC2.

VM2, VM3, and VM4 communicate with a VM outside the second subnet by using a second switch, where the switch herein may be virtual, or may be physical. An IP address of the second switch uses 10.10.10.3 as an example, and the second switch is represented by VTEP2 in a tunnel VM7 communicates with a VM outside the second subnet by using a third switch. An IP address of the third switch uses 11.11.11.3 as an example, and the third switch is represented by VTEP3 in a tunnel An IP address of VM2 uses 192.168.2.2 as an example, and a MAC address of VM2 is represented by MAC-VM2. An IP address of VM3 uses 192.168.2.3 as an example, and a MAC address of VM3 is represented by MAC-VM3. An IP address of VM4 uses 192.168.2.4 as an example, and a MAC address of VM4 is represented by MAC-VM4. An IP address of VM7 uses 192.168.2.7 as an example, and a MAC address of VM7 is represented by MAC-VM7.

The first switch may be the same as or different from the second switch.

VM5 and VM6 located in DC2 belong to a third subnet (which may also be represented by a subnet 3), and a VNI of the subnet uses 33333 as an example. An IP address of a gateway of the third subnet in DC1 uses 192.168.3.1 as an example, and a MAC address of the gateway of the third subnet in DC1 is MAC3. An IP address of a gateway of the third subnet in DC2 uses 192.168.3.1 as an example, and a MAC address of the gateway of the third subnet in DC2 is MAC3. The IP address of the gateway of the third subnet in DC1 may be the same as or different from the IP address of the gateway of the third subnet in DC2. The MAC address of the gateway of the third subnet in DC1 may be the same as or different from the MAC address of the gateway of the third subnet in DC2.

VM5 and VM6 communicate with a VM outside the third subnet by using a fourth switch, where the switch herein may be virtual, or may be physical. An IP address of the fourth switch uses 11.11.11.4 as an example, and the fourth switch is represented by a VTEP4 in a tunnel An IP address of VM5 uses 192.168.3.5 as an example, and a MAC address of VM5 is represented by MAC-VM5. An IP address of VM6 uses 192.168.3.6 as an example, and a MAC address of VM6 is represented by MAC-VM6.

The third switch may be the same as or different from the fourth switch.

One or more routers are deployed in DC1, and a description is provided by using an example in which router 1 is deployed. Router 1 is represented by VTEP5 in a tunnel, and an IP address of router 1 uses 10.10.10.5 as an example. Similarly, one or more routers are deployed in DC2, and a description is provided by using an example in which router 2 is deployed. Router 2 is represented by VTEP6 in a tunnel, and an IP address of router 2 uses 11.11.11.6 as an example.

For a case in which multiple routers are deployed, reference may be made to FIG. 1b. For example, router 1 and router 3 may form a cluster, thereby eliminating a bottleneck in a single router, and implementing elastic scaling among routers. A quantity of deployed routers is not limited in the present invention, and certainly, may also be greater than 2. Other information in FIG. 1b is similar to that in FIG. 1a, and is not described in detail again.

Figure 2:
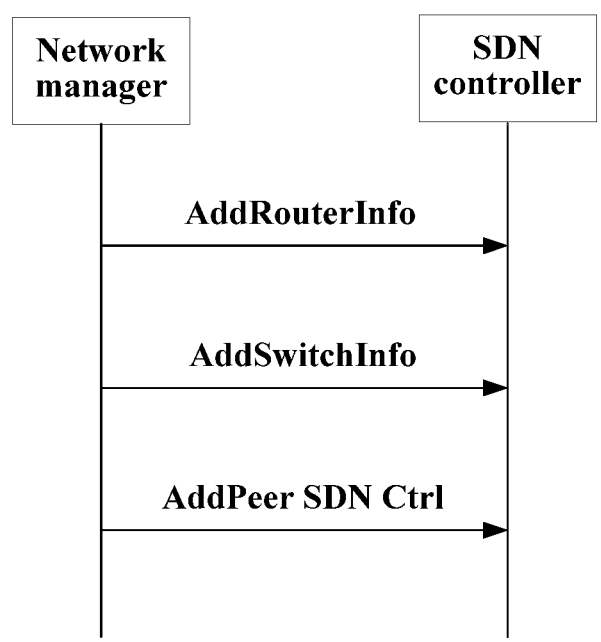
FIG. 2 is a schematic diagram of a configuration method according to an embodiment of the present invention.

Refer to FIG. 2 that describes a process in which a network manager configures any SDN controller, where the following three commands: AddRouterInfo, AddSwitchInfo, and ADDPeerSDNCtrl are included, but do not constitute any limitation.

AddRouterInfo is used to configure an IP address of a router and identifier information of a DC, and a description is provided by using Table 1 as an example.

TABLE 1

| Item | Type | Description |
| --- | --- | --- |
| RouterIPAddress | String | IP address of a router |
| DCName | String | Identifier of a data center |

AddSwitchInfo is used to configure VTEP information of a switch and identifier information of a DC, and a description is provided by using Table 2 as an example.

TABLE 2

| Item | Type | Description |
| --- | --- | --- |
| VTEPIPAddress | String | IP address of a switch used as IP address of a VTEP |
| DCName | String | Identifier of a data center |

ADDPeerSDNCtrl is used to configure an IP address of a peer SDN controller and an identifier of a peer DC, and a description is provided by using Table 3 as an example.

TABLE 3

| Item | Type | Description |
| --- | --- | --- |
| PeerSDNCtrlIPAddress | String | IP address of a peer SDN controller |
| PeerDCName | String | Identifier of a peer data center |

Optionally, the SDN controller saves information about the items in Table 1 to Table 3 in the form of a flow table.

Figure 3:
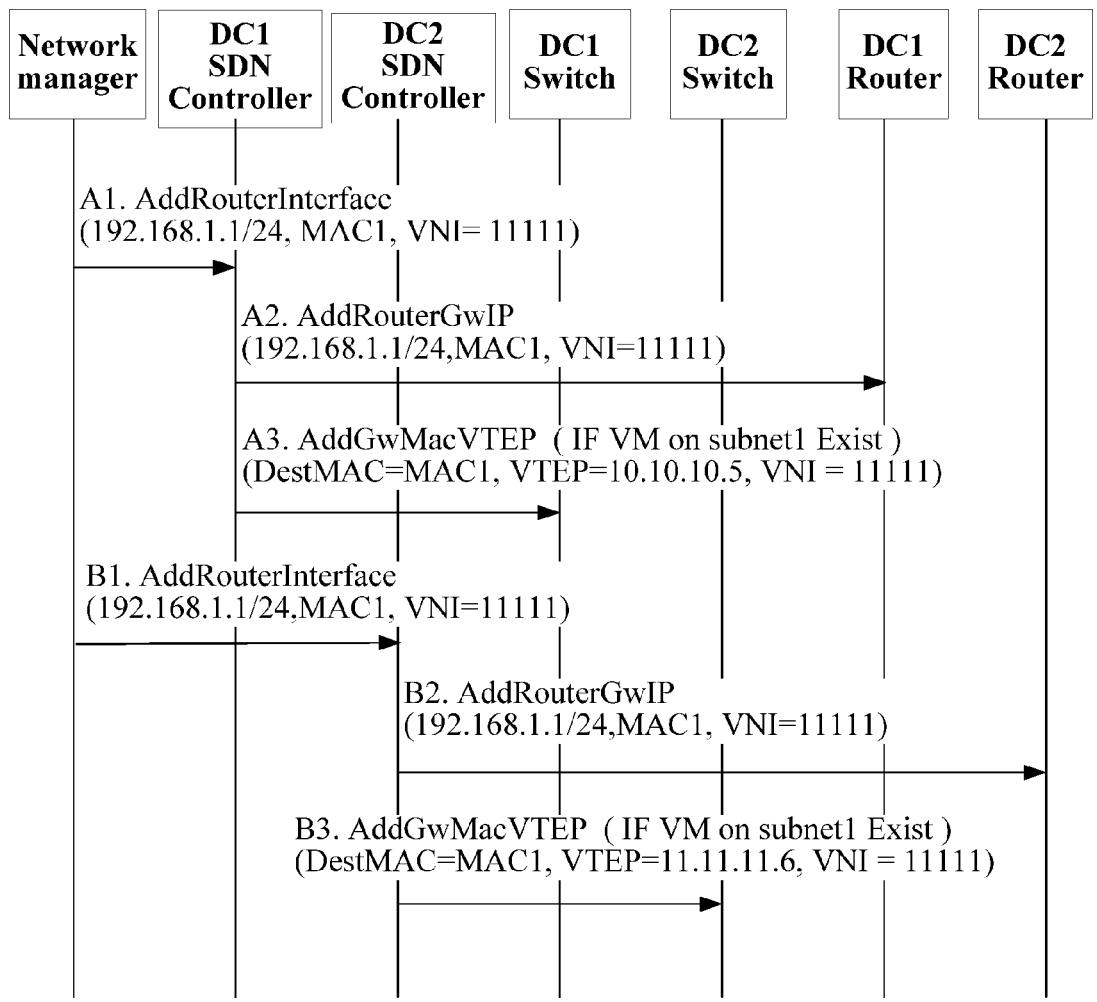
FIG. 3 is a flowchart of a configuration method according to an embodiment of the present invention.

Then, with reference to FIG. 3, a process is described in which a network manager configures each subnet by using an SDN controller.

(A1) The NetworkManager adds an association between a subnet and a router to an SDN controller in DC1, where a specific adding command uses AddRouterInterface as an example. An example in which subnet 1 is added is used. A VNI of subnet 1 is 11111; an IP address of a gateway of the subnet in DC1 is 192.168.1.1/24, where 24 indicates that a subnet mask is 255.255.255.0; a MAC address of the gateway of the subnet in DC1 is MAC1.

Optionally, the SDN controller saves added information in the form of a flow table; similarly, the SDN controller also saves other added information in the form of a flow table in the following.

(A2) The SDN controller in DC1 adds the association between a subnet and a router to router 1 in DC1, where a specific adding command uses AddRouterGwIP as an example.

(A3) In a case in which a VM has been created in subnet 1, the SDN controller adds, to a switch of the current data center, VTEP information corresponding to the MAC address of the gateway, where a specific adding command uses AddGwMacVTEP as an example. Using information in FIG. 1a and FIG. 1b as an example, if VM1 in subnet 1 sends a packet, and a MAC address of a gateway corresponding to the packet is MAC1, the packet is sent to a router whose VTEP is 10.10.10.5, where a processing interface on the router is determined by a VNI. The switch of the current data center saves the VTEP information corresponding to the MAC address of the gateway in the form of a flow table.

(B1) The NetworkManager adds an association between a subnet and a router to an SDN controller in DC2, where a specific adding command uses AddRouterInterface as an example. An example in which subnet 1 is added is used. A VNI of subnet 1 is 11111; an IP address of a gateway of the subnet in DC2 is 192.168.1.1/24, where 24 indicates that a subnet mask is 255.255.255.0; a MAC address of the gateway of the subnet in DC2 is MAC1.

(B2) The SDN controller in DC2 adds the association between a subnet and a router to router 2 in DC2, where a specific adding command uses AddRouterGwIP as an example.

(B3) In a case in which a VM has been created in subnet 1, the SDN controller adds, to a switch of the current data center, VTEP information corresponding to the MAC address of the gateway, where a specific adding command uses AddGwMacVTEP as an example. Using information in FIG. 1a and FIG. 1b as an example, if VM1 in subnet 1 sends a packet, and a MAC address of a gateway corresponding to the packet is MAC1, the packet is sent to a router whose VTEP is 11.11.11.6, where a processing interface on the router is determined by a VNI.

A sequence of performing steps (B1), (B2), and (B3), and steps (A1), (A2), and (A3) is not limited. Similarly, the network manager and the SDN controller may add an association between another subnet and a router.

During configuration shown in FIG. 3, the IP address of the gateway of subnet 1 in DC1 and the IP address of the gateway of subnet 1 in DC2 are the same, and the MAC address of the gateway of subnet 1 in DC1 and the MAC address of the gateway of subnet 1 in DC2 are the same, but VTEP information (namely, IP addresses of the VTEPs of the routers) of the routers is different.

A process of creating a VM and implementing information synchronization is described below with reference to FIG. 4a, and creation of VM2 is used as an example.

(A1) Initiate a command of creating the virtual machine VM2 to a second switch of DC1, where a specific creation command uses Create VM on switch as an example.

(A2) The second switch of DC1 creates VM2, and then notifies an SDN controller of DC1 of a virtual port of VM2 and corresponding VTEP information, where a specific notification command uses VM vPort VTEP notify as an example. A MAC address of VM2 is MAC-VM2, and an IP address of VM2 is 192.168.2.2. VM2 belongs to a second subnet, and a VNI is 22222. The VTEP information corresponding to VM2 is 10.10.10.3. When the SDN controller of DC1 has stored VTEP information of the second switch in which VM2 is located, the second switch only needs to notify the SDN controller of DC1 of information about the virtual port of VM2.

The SDN controller can obtain a VNI of the port according to the port information.

(A3) The SDN controller of DC1 notifies an SDN controller of DC2 of the virtual port of VM2 and the corresponding VTEP information, where a specific notification command uses VM vPort VTEP notify as an example. Specifically, the SDN controller of DC1 may acquire, by using AddSwitchInfo, VTEP information of a vSwitch (i.e., the second switch) in which VM2 is located, and then notifies the SDN controller of DC2 of the virtual port of VM2 and the corresponding VTEP information.

(A4.1) The SDN controller of DC1 adds information about VM2 to a router of DC1, where a specific adding command uses AddVMMacVTEP as an example, and IP=192.168.2.2, MAC=MAC-VM2, VNI=22222, and VTEP=10.10.10.3 of VM2 are included.

(A4.2) The SDN controller of DC2 adds the information about VM2 to a router of DC2, where a specific adding command uses AddVMMacVTEP as an example, and IP=192.168.2.2, MAC=MAC-VM2, VNI=22222, and VTEP=10.10.10.3 of VM2 are included.

A sequence of performing (A3) and (A4.1) is not limited, and a sequence of performing (A4.1) and (A4.2) is not limited either.

(A5) The SDN controller of DC1 adds, to a switch of DC1, VTEP information corresponding to a MAC address of a gateway, where a specific adding command uses AddGwMacVTEP as an example. Using VM2 as an example, if VM2 in subnet 2 sends a packet, and a MAC address of a gateway corresponding to the packet is MAC2, the packet is sent to a router whose VTEP is 10.10.10.5, where VNI=22222 is used to determine a processing interface on the router.

Figure 4A:
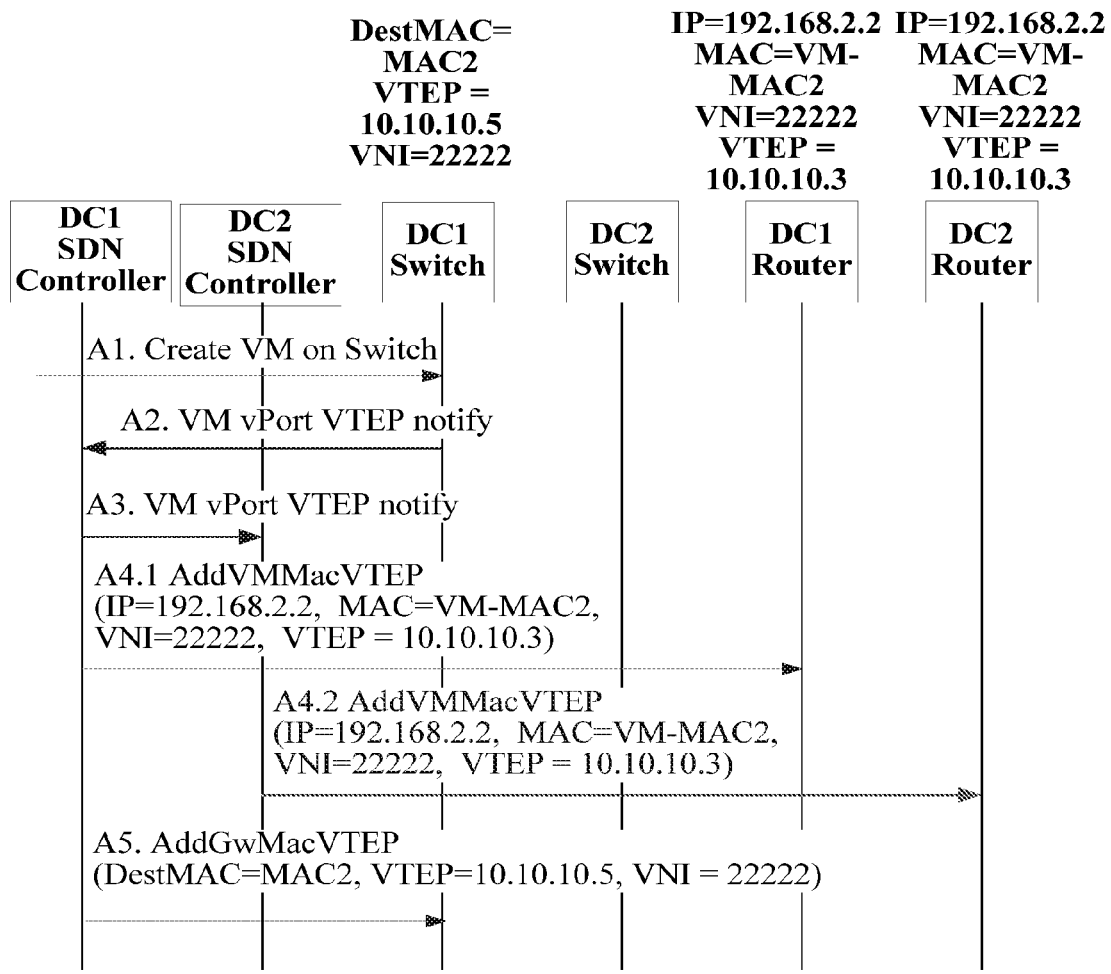
FIG. 4a is a flowchart of adding a VM according to an embodiment of the present invention.

As shown in (B3) and (A3) in FIG. 3, in a case in which a VM has been created in a subnet, an SDN controller adds, to a switch of a current data center, VTEP information corresponding to a MAC address of a gateway; if no VM has been created when a subnet is created in FIG. 3, VTEP information corresponding to a MAC address of a gateway may be added to a switch of a current data center by using (A5) in FIG. 4a.

A sequence of performing (A5) and (A3) to (A4.2) is not limited.

A process of deleting a VM and implementing information synchronization is described below with reference to FIG. 4b, and deletion of VM2 is used as an example.

(B1) Initiate a command of deleting the virtual machine VM2 to a second switch of DC1, where a specific deletion command uses delete VM on switch as an example.

(B2) The second switch of DC1 deletes VM2, and then notifies an SDN controller of DC1 to delete a virtual port of VM2 and corresponding VTEP information, where a specific notification command uses delete VM vPort notify as an example.

Corresponding to (A5) in FIG. 4a, VTEP information corresponding to a MAC address of a gateway may also be deleted in step (B2).

(B3) The SDN controller of DC1 notifies an SDN controller of DC2 to delete information about VM2, where a specific notification command uses delete VM vPort notify as an example.

(B4.1). The SDN controller of DC1 deletes a MAC address and the VTEP information of VM2 from a router of DC1, where a specific deletion command uses DeleteRouterMacVTEP as an example, and IP=192.168.2.2, MAC=MAC-VM2, and VNI=22222 of VM2 are included.

Certainly, it may also be that MAC=MAC-VM2 and VNI=22222 are deleted, or it may further be that MAC=MAC-VM2, VNI=22222, and VTEP=10.10.10.3 are deleted.

(B4.2) The SDN controller of DC2 deletes the MAC address and the VTEP information of VM2 from a router of DC2, where a specific deletion command uses DeleteRouterMacVTEP as an example, and IP=192.168.2.2, MAC=MAC-VM2, and VNI=22222 of VM2 are included.

Certainly, similar to (B4.1), it may also be that MAC=MAC-VM2 and VNI=22222 are deleted, or it may further be that MAC=MAC-VM2, VNI=22222, and VTEP=10.10.10.3 are deleted.

A sequence of performing (B3) and (B4.1) is not limited, and a sequence of performing (B4.1) and (B4.2) is not limited either.

Virtual machine migration may be split into two operations of VM creation and VM deletion. For details, reference may be made to processes described in FIG. 4a and FIG. 4b, which are not described in detail again.

By means of the configuration processes in FIG. 2 to FIG. 4, an SDN controller of DC1 obtains information about router 1 in DC1, information about a first switch, information about a second switch, an association between each subnet and a router in DC1, and a MAC address and VTEP information of each virtual machine in DC1; meanwhile, the SDN controller of DC1 also obtains information about an SDN controller of DC2, and a MAC address and VTEP information of a virtual machine controlled by the SDN controller of DC2, which may be MAC addresses and VTEP information of some virtual machines controlled by the SDN controller of DC2, or may be MAC addresses and VTEP information of all virtual machines controlled by the SDN controller of DC2. Similarly, the SDN controller of DC2 obtains information about router 2 in DC2, information about a third switch, information about a fourth switch, an association between each subnet and a router in DC2, and a MAC address and VTEP information of each virtual machine in DC2; meanwhile, the SDN controller of DC2 also obtains information about the SDN controller of DC1, and a MAC address and VTEP information of a virtual machine controlled by the SDN controller of DC1, which may be MAC addresses and VTEP information of some virtual machines controlled by the SDN controller of DC1, or may be MAC addresses and VTEP information of all virtual machines controlled by the SDN controller of DC1.

In the system architectures shown in FIG. 1a and FIG. 1b, for details about how to implement communication between virtual machines, refer to descriptions provided in the following embodiments.

Method for Implementing Communication Between Virtual Machines

A method for implementing communication between virtual machines according to an embodiment of the present invention is introduced in the following, and the method can be implemented in the system architectures of the foregoing embodiments.

Figure 5A:
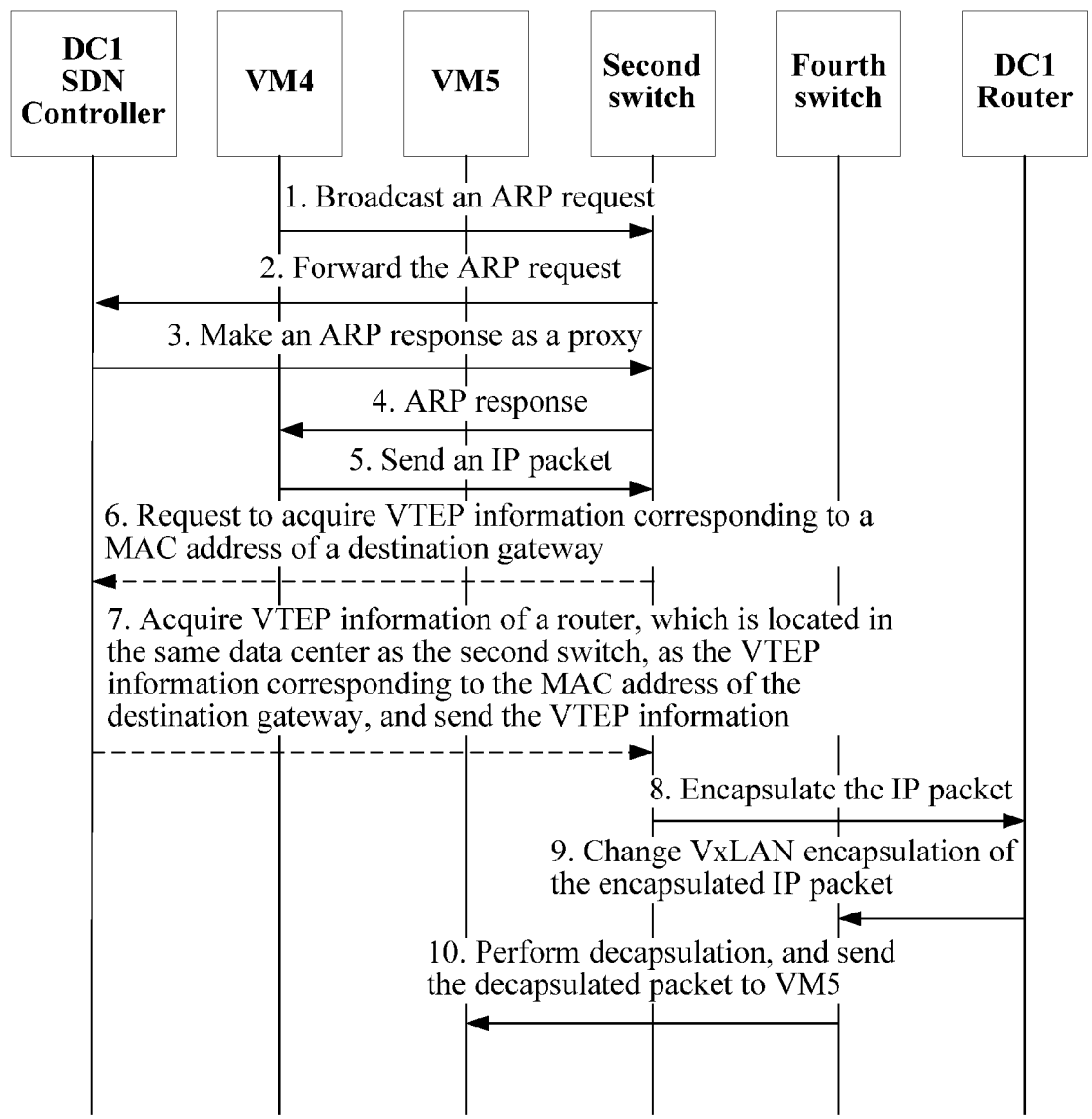
FIG. 5a is a flowchart for implementing communication between VMs according to an embodiment of the present invention.

An embodiment of a method for implementing communication between virtual machines, which is shown in FIG. 5a, is used to implement communication between a virtual machine VM4 located in a data center DC1 and a virtual machine VM5 located in a data center DC2, where VM4 is located in a second subnet, and VM5 is located in a third subnet. VM4 communicates with a VM outside the second subnet by using a second switch, and VM5 communicates with a VM outside the third subnet by using a fourth switch. The method includes the following steps:

(1) VM4 needs to communicate with VM5. VM4 discovers, by querying a routing table, that VM4 and VM5 are located in different subnets. Then VM4 uses a default gateway 192.168.2.1 of the second subnet as a destination gateway. VM4 sends a broadcast Address Resolution Protocol (ARP) request to the second switch to acquire a MAC address of the destination gateway in a broadcast manner, where the ARP request carries an IP address of the destination gateway.

(2) The second switch receives the ARP request, and forwards the ARP request to an SDN controller of the first data center.

(3) The SDN controller of the first data center receives the ARP request, queries a locally stored flow table according to the IP address of the destination gateway carried in the ARP request, and acquires MAC2 as the MAC address of the destination gateway. The SDN controller sends an ARP response to the second switch, where the ARP response carries the MAC address of the destination gateway, and the ARP response is equivalent to a reply that is made by a proxy to the broadcast ARP request.

Optionally, the ARP request may further carry port information of the second switch that receives the ARP response, the SDN controller queries the flow table according to the port information and obtains a VNI corresponding to the port information, and acquiring the MAC address of the destination gateway specifically includes: acquiring, by the SDN controller, the MAC address of the destination gateway according to the IP address of the destination gateway and the VNI corresponding to the port information. Specifically, the port information may be information about a virtual port, of VM4, on the second switch.

Optionally, the ARP request may further carry a VNI of a port of the second switch that receives the ARP response, and acquiring the MAC address of the destination gateway specifically includes: acquiring, by the SDN controller, the MAC address of the destination gateway according to the IP address of the destination gateway and the VNI of the port of the second switch.

(4) The second switch receives the ARP response, and forwards the ARP response to VM4.

(5) VM4 sends an IP packet to the second switch, where a destination MAC (DestMAC) of the IP packet is MAC2, a destination IP (DestIP) of the IP packet is an IP address of VM5: 192.168.3.5, a source MAC of the IP packet is a MAC of VM4 (which is represented by MAC-VM4), and a source IP of the IP packet is an IP address of VM4: 192.168.2.4.

Figure 4B:
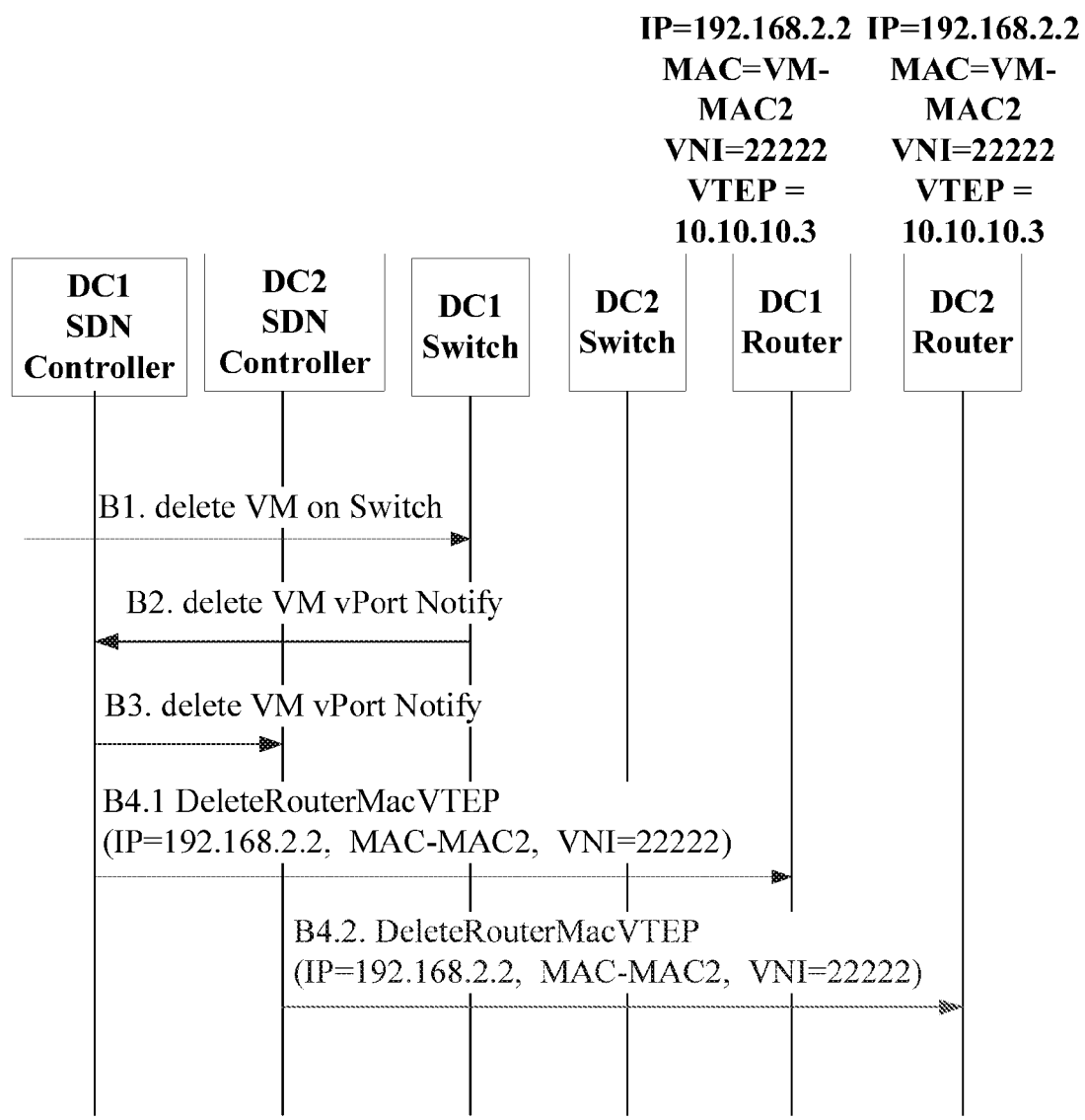
FIG. 4b is a flowchart of deleting a VM according to an embodiment of the present invention.

By means of the configuration processes in FIG. 3, FIG. 4a, and FIG. 4b, the second switch may temporarily store VTEP information corresponding to MAC2. If the second switch discovers that the VTEP information corresponding to MAC2 exists, step (8) is directly performed; if the second switch discovers that no VTEP information corresponding to MAC2 exists, step (6) and step (7) are performed.

(6) The second switch sends a request to the SDN controller of the current data center to request to acquire VTEP information corresponding to the MAC address of the destination gateway.

(7) The SDN controller queries the locally stored flow table, acquires the VTEP information corresponding to the MAC address of the destination gateway, and sends, to the second switch, the VTEP information corresponding to the MAC address of the destination gateway.

When the SDN controller queries the locally stored flow table according to the MAC address of the destination gateway and acquires two or more pieces of VTEP information, VTEP information of a router, which is located in the same data center as the second switch, is used as the VTEP information corresponding to the MAC address of the destination gateway.

In this embodiment, if two pieces of VTEP information, namely, VTEP5 (whose IP is 10.10.10.5) and VTEP6 (whose IP is 11.11.11.6), are acquired according to MAC2, VTEP5 located in the same data center as the second switch is selected as a VTEP corresponding to the MAC address of the destination gateway.

When two or more pieces of VTEP information corresponding to the MAC address of the destination gateway exist in the first data center, as shown in the solution of multiple routers shown in FIG. 1b, the SDN controller selects a suitable VTEP for VM4 according to at least one of the following: load of a router and a scheduling policy, and sends an IP address of the selected suitable VTEP to the second switch. The load of a router includes but is not limited to traffic of the router and CPU load of the router; the scheduling policy includes but is not limited to RondRobin, least load first, and maximum load first.

(8) The second switch acquires the VTEP information corresponding to the MAC address of the destination gateway, performs VxLAN encapsulation on the IP packet received from VM4, and sends the IP packet to a router corresponding to the VTEP information, where a source IP of the IP packet on which the VxLAN encapsulation is performed is an IP address of the second switch, namely, 10.10.10.3, a destination IP of the IP packet on which the VxLAN encapsulation is performed is the acquired VTEP information (10.10.10.5), and a VNI is 22222.

If the second switch discovers, by querying a local flow table, that no VTEP information corresponding to MAC2 exists, the VTEP information corresponding to the MAC address of the destination gateway is acquired by using the foregoing step (6) and step (7), or the second switch acquires, by querying a local flow table, the VTEP information corresponding to the MAC address of the destination gateway. Specifically, when two or more pieces of VTEP information are acquired, VTEP information of a router that is located in the same data center as the second switch is used as the VTEP information corresponding to the MAC address of the destination gateway. When a same data center has multiple routers, selection is performed according to load of a router and a scheduling policy, which is similar to that in step (7) and is not described in detail again.

(9) The router of the first data center changes the VxLAN encapsulation of the received packet, and sends the packet to the fourth switch through a tunnel between the router of the first data center and the fourth switch.

By means of the configuration processes in FIG. 3, FIG. 4a, and FIG. 4b, the router of the first data center temporarily stores a MAC address and VTEP information of a virtual machine of the second data center; therefore, a VxLAN tunnel can be directly established between the router of the first data center and the fourth switch, and through the tunnel between the router of the first data center and the fourth switch, the packet whose encapsulation has been changed is directly sent to the fourth switch without passing through a router of the second data center.

Changing the VxLAN encapsulation is specifically: changing the source IP of the VxLAN encapsulation in step (8) to 10.10.10.5, changing the destination IP of the VxLAN encapsulation in step (8) to an IP address of the fourth switch, namely, 11.11.11.4, and changing the VNI of the VxLAN encapsulation in step (8) to 33333; and then changing the destination MAC of the IP packet in step (5) to MAC-VM5, and changing the source MAC of the IP packet in step (5) to MAC2. By changing the VxLAN encapsulation, the fourth switch receives the encapsulated IP packet and directly performs processing without triggering a process of broadcasting an ARP request any more.

(10) The fourth switch sends the IP packet to VM5 after VxLAN decapsulation is performed.

A process in which VM5 sends an IP packet to VM4 is similar to the foregoing process, and is not described in detail again.

Figure 5B:
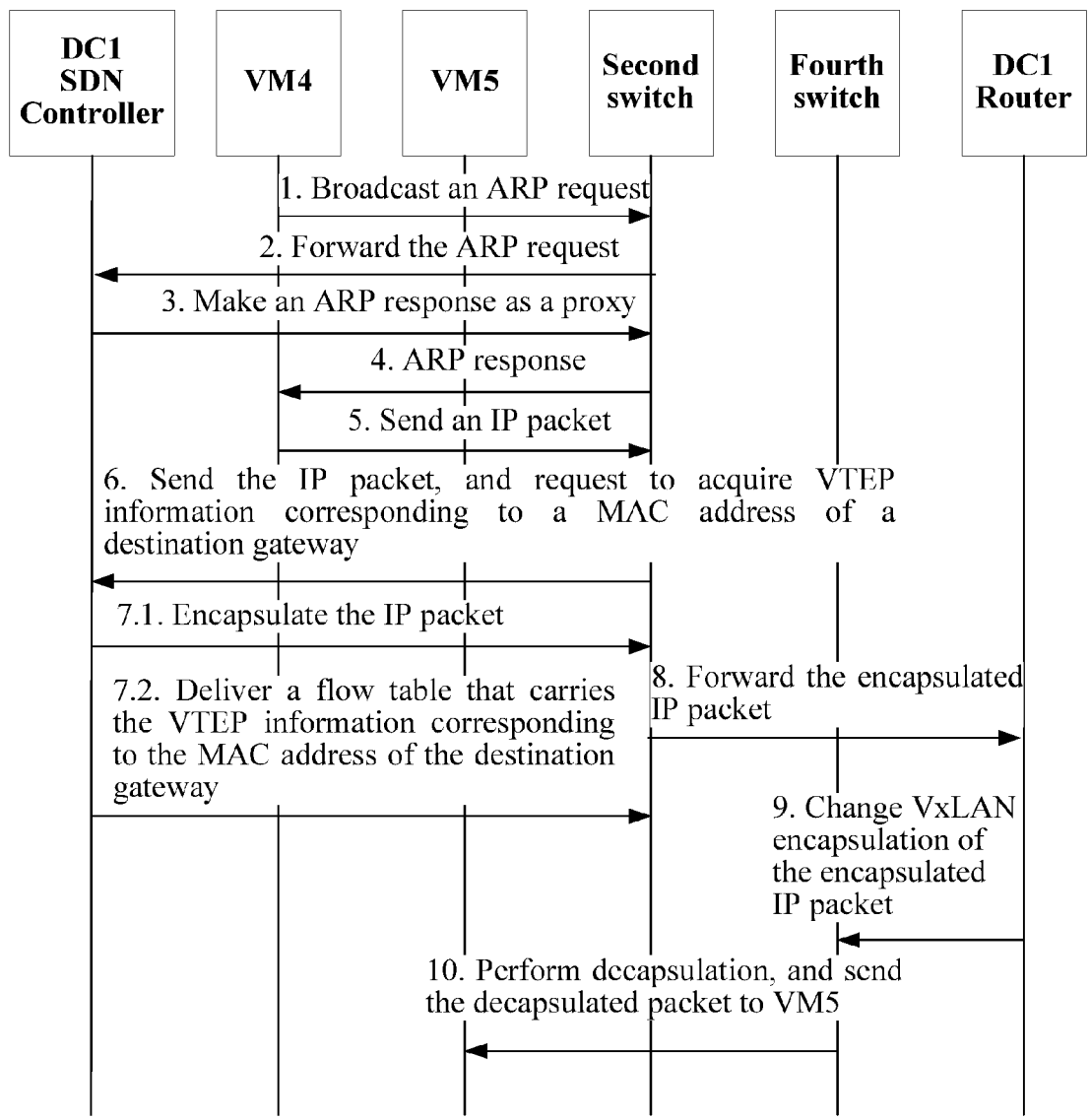
FIG. 5b is a flowchart for implementing communication between VMs according to an embodiment of the present invention.

Refer to an embodiment of a method for implementing communication between virtual machines that is shown in FIG. 5b, where an application scenario is similar to that in the embodiment shown in FIG. 5a. The following describes an interaction process in detail.

(1) to (4) are similar to (1) to (4) in the embodiment shown in FIG. 5a, and are not described in detail again.

(5) VM4 sends an IP packet to the second switch, where a destination MAC (DestMAC) of the IP packet is MAC2, a destination IP (DestIP) of the IP packet is an IP address of VM5: 192.168.3.5, a source MAC of the IP packet is a MAC of VM4 (which is represented by MAC-VM4), and a source IP of the IP packet is an IP address of VM4: 192.168.2.4.

(6) The second switch sends a request to the SDN controller of the current data center to request to acquire VTEP information corresponding to the MAC address of the destination gateway.

(7.1) The SDN controller queries the locally stored flow table and acquires the VTEP information corresponding to the MAC address of the destination gateway; the SDN controller performs VxLAN encapsulation on the IP packet received from the second switch and sends the IP packet to the second switch, where a source IP of the IP packet on which the VxLAN encapsulation is performed is an IP address of the second switch, namely, 10.10.10.3, a destination IP of the IP packet on which the VxLAN encapsulation is performed is the acquired VTEP information (10.10.10.5), and a VNI is 22222.

When the SDN controller queries the locally stored flow table according to the MAC address of the destination gateway and acquires two or more pieces of VTEP information, VTEP information of a router, which is located in the same data center as the second switch, is used as the VTEP information corresponding to the MAC address of the destination gateway.

In this embodiment, if two pieces of VTEP information, namely, VTEP5 (whose IP is 10.10.10.5) and VTEP6 (whose IP is 11.11.11.6), are acquired according to MAC2, VTEP5 located in the same data center as the second switch is selected as a VTEP corresponding to the MAC address of the destination gateway.

When two or more pieces of VTEP information corresponding to the MAC address of the destination gateway exist in the first data center, as shown in the solution of multiple routers shown in FIG. 1b, the SDN controller selects a suitable VTEP for VM4 according to at least one of the following: load of a router and a scheduling policy, and sends an IP address of the selected suitable VTEP to the second switch. The load of a router includes but is not limited to traffic of the router and CPU load of the router; the scheduling policy includes but is not limited to RondRobin, least load first, and maximum load first.

(7.2) In another aspect, the SDN controller sends the VTEP information corresponding to the MAC address of the destination gateway to the second switch in the form of a flow table. When receiving an IP packet subsequently, the second switch may directly forward, according to the VTEP information corresponding to the MAC address of the destination gateway, the subsequently received IP packet on which encapsulation is performed to a router corresponding to the VTEP information, without requesting a flow table from the SDN controller any more.

(8) The second switch receives, from the SDN controller, the IP packet on which the VxLAN encapsulation is performed, and forwards, according to VTEP information in the IP packet on which the VxLAN encapsulation is performed, the IP packet on which the VxLAN encapsulation is performed to the router corresponding to the VTEP information.

It should be noted that a sequence of performing step (7.2) and step (8) is not limited.

(9) and (10) are similar to (9) and (10) in the embodiment shown in FIG. 5a, and are not described in detail again.

By means of any of the foregoing processes, communication across data centers and subnets is implemented, and an SDN controller can serve as a proxy to make a reply to a broadcast ARP request sent by a VM, which reduces transmission bandwidth occupied by packet broadcasting. In addition, during communication between VMs, instead of passing through both a router of a first data center and a router of a second data center, a packet passes only through a router of a first data center, which alleviates roundabout routing of the packet between the data centers.

Figure 6A:
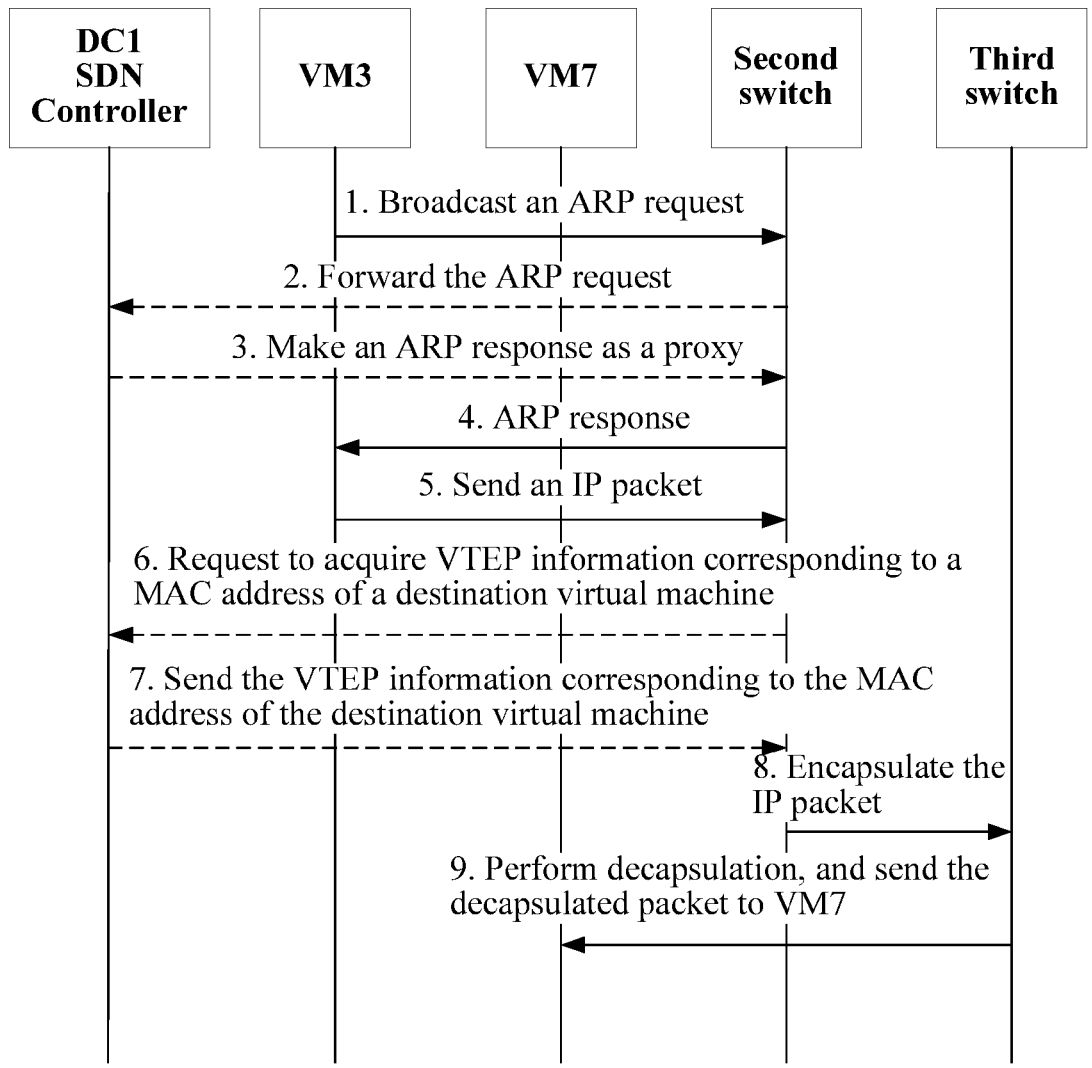
FIG. 6a is a flowchart for implementing communication between VMs according to an embodiment of the present invention.

An embodiment of a method for implementing communication between virtual machines, which is shown in FIG. 6a, is used to implement communication between a virtual machine VM3 located in a data center DC1 and a virtual machine VM7 located in a data center DC2, where both VM3 and VM7 are located in a second subnet. VM3 communicates with a VM outside the second subnet by using a second switch, and VM7 communicates with a VM outside the second subnet by using a third switch. The method includes the following steps:

(1) VM3 needs to communicate with VM7. VM3 discovers, by querying a routing table, that VM3 and VM7 are located in the same subnet. If VM3 does not store a MAC address of VM7, VM3 sends a broadcast Address Resolution Protocol (ARP) request to the second switch to acquire the MAC address of the destination virtual machine in a broadcast manner, where the ARP request carries an IP address of VM7.

(2) The second switch forwards the ARP request to an SDN controller of the first data center.

(3) The SDN controller of the first data center receives the ARP request, queries a locally stored flow table according to the IP address of the destination virtual machine carried in the ARP request, and acquires MAC-VM7 as the MAC address of the destination virtual machine. The SDN controller sends an ARP response to the second switch, where the ARP response carries the MAC address of the destination virtual machine, and the ARP response is equivalent to a reply that is made by a proxy to the broadcast ARP request.

(4) The second switch receives the ARP response, and forwards the ARP response to VM3.

(5) VM3 sends an IP packet to the second switch, where a destination MAC (DestMAC) of the IP packet is MAC-VM7, a destination IP (DestIP) of the IP packet is the IP address of VM7: 192.168.2.7, a source MAC of the IP packet is a MAC of VM3 (which is represented by MAC-VM3), and a source IP of the IP packet is an IP address of VM3: 192.168.2.3.

By means of the configuration processes in FIG. 4a and FIG. 4b, the second switch may temporarily store VTEP information corresponding to MAC-VM7. If the second switch discovers that the VTEP information corresponding to MAC-VM7 exists, step (8) is directly performed; if the second switch discovers that no VTEP information corresponding to MAC-VM7 exists, step (6) and step (7) are performed.

(6) The second switch sends a request to the SDN controller of the current data center to request to acquire the VTEP information corresponding to the MAC address of the destination virtual machine.

(7) The SDN controller queries the locally stored flow table, acquires the VTEP information corresponding to the MAC address of the destination virtual machine, and sends, to the second switch, the VTEP information corresponding to the MAC address of the destination virtual machine.

In this embodiment, an acquired VTEP is VTEP3 and the VTEP information is 11.11.11.3 according to MAC-VM7.

(8) The second switch acquires the VTEP information corresponding to the MAC address of the destination virtual machine, performs VxLAN encapsulation on the IP packet received from VM3, and sends the IP packet to a switch corresponding to the VTEP information, where a source IP of the IP packet on which the VxLAN encapsulation is performed is an IP address of the second switch, namely, 10.10.10.3, and a destination IP of the IP packet on which the VxLAN encapsulation is performed is the acquired VTEP information (11.11.11.3).

If the second switch discovers, by querying a local flow table, that no VTEP information corresponding to MAC-VM7 exists, the VTEP information corresponding to the MAC address of the destination virtual machine is acquired by using the foregoing step (6) and step (7), or the second switch acquires, by querying a local flow table, the VTEP information corresponding to the MAC address of the destination virtual machine.

By using the configuration methods in FIG. 2, FIG. 3, FIG. 4a, and FIG. 4b, the SDN controller of the first data center acquires, from an SDN controller of the second data center, the IP address and the MAC address of VM7 and VTEP information of the third switch, and sends the IP address and the MAC address of VM7 and the VTEP information of the third switch to the second switch. In this way, the second switch can send the IP packet to VM7 through a tunnel between the second switch and the third switch. That is, the IP packet does not need to pass through a router of data center 1 (i.e., the first data center) and does not need to pass through a router of data center 2 (i.e., the second data center) either.

(9) The third switch sends the IP packet to VM7 after VxLAN decapsulation is performed.

A process in which VM7 sends an IP packet to VM3 is similar to the foregoing process, and is not described in detail again.

Figure 6B:
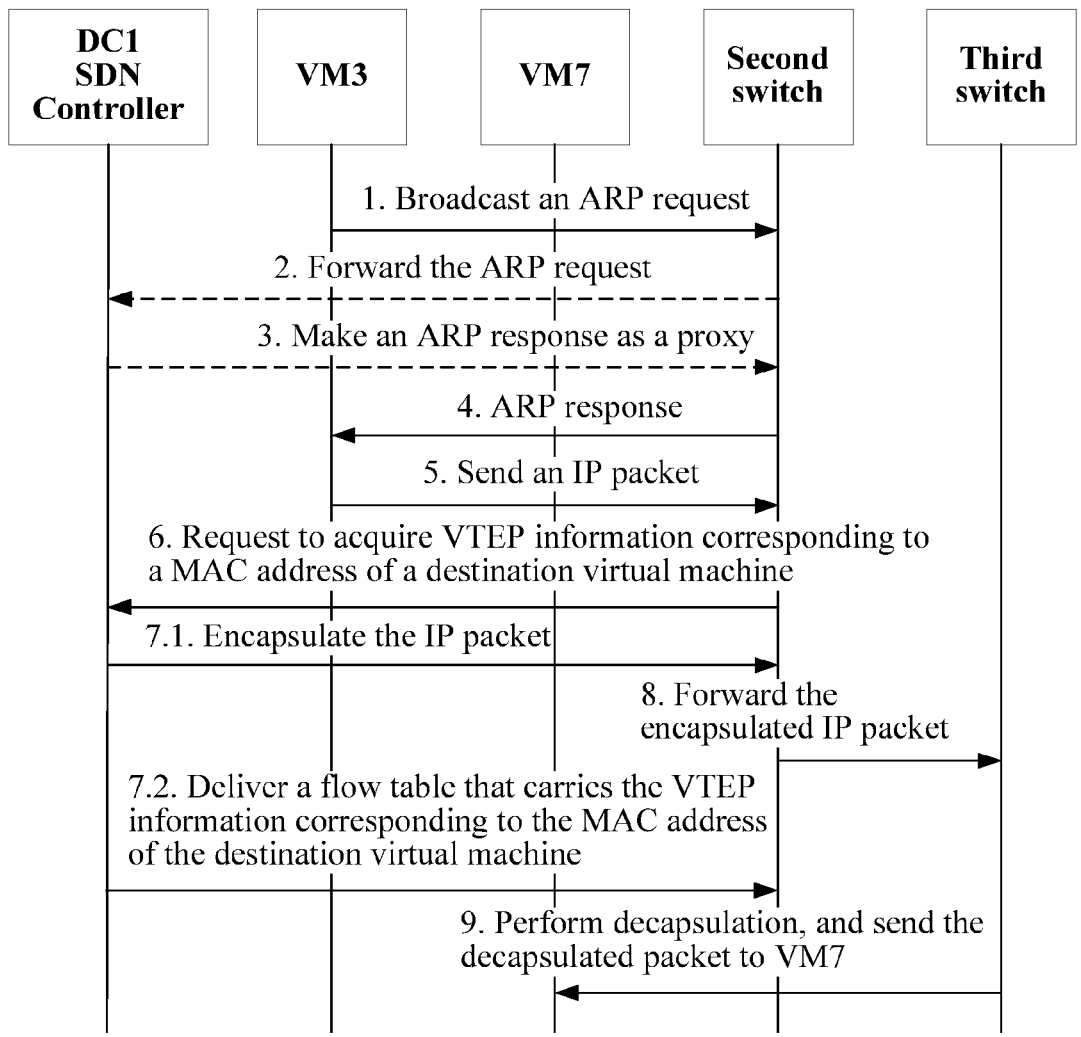
FIG. 6b is a flowchart for implementing communication between VMs according to an embodiment of the present invention.

Refer to an embodiment of a method for implementing communication between virtual machines that is shown in FIG. 6b, where an application scenario is similar to that in the embodiment shown in FIG. 6a. The following describes an interaction process in detail.

(1) VM3 needs to communicate with VM7. VM3 discovers, by querying a routing table, that VM3 and VM7 are located in a same subnet. If VM3 does not store a MAC address of VM7, VM3 sends a broadcast Address Resolution Protocol (ARP) request to a second switch to acquire the MAC address of the destination virtual machine in a broadcast manner, where the ARP request carries an IP address of VM7.

(2) The second switch forwards the ARP request to an SDN controller of a first data center.

(3) The SDN controller of the first data center receives the ARP request, queries a locally stored flow table according to the IP address of the destination virtual machine carried in the ARP request, and acquires MAC-VM7 as the MAC address of the destination virtual machine. The SDN controller sends an ARP response to the second switch, where the ARP response carries the MAC address of the destination virtual machine, and the ARP response is equivalent to a reply that is made by a proxy to the broadcast ARP request.

(4) The second switch receives the ARP response, and forwards the ARP response to VM3.

(5) VM3 sends an IP packet to the second switch, where a destination MAC (DestMAC) of the IP packet is MAC-VM7, a destination IP (DestIP) of the IP packet is the IP address of VM7: 192.168.2.7, a source MAC of the IP packet is a MAC (which is represented by MAC-VM3) of VM3, and a source IP of the IP packet is an IP address of VM3: 192.168.2.3.

(6) The second switch sends a request to the SDN controller of the current data center to request to acquire VTEP information corresponding to the MAC address of the destination virtual machine.

(7.1) The SDN controller queries the locally stored flow table and acquires the VTEP information corresponding to the MAC address of the destination virtual machine; the SDN controller performs VxLAN encapsulation on the IP packet received from the second switch and sends the IP packet to the second switch.

In this embodiment, an acquired VTEP is VTEP3 and the VTEP information is 11.11.11.3 according to MAC-VM7. A source IP of the IP packet on which the VxLAN encapsulation is performed is an IP address of the second switch, namely, 10.10.10.3, a destination IP of the IP packet on which the VxLAN encapsulation is performed is the acquired VTEP information (11.11.11.3), and a VNI is 22222.

(7.2) In another aspect, the SDN controller sends the VTEP information corresponding to the MAC address of the destination virtual machine to the second switch in the form of a flow table. When receiving an IP packet subsequently, the second switch may directly forward, according to the VTEP information corresponding to the MAC address of the destination virtual machine, the subsequently received IP packet on which encapsulation is performed to a router corresponding to the VTEP information, without requesting a flow table from the SDN controller any more.

(8) The second switch receives, from the SDN controller, the IP packet on which the VxLAN encapsulation is performed, and forwards, according to VTEP information in the IP packet on which the VxLAN encapsulation is performed, the IP packet on which the VxLAN encapsulation is performed to the router corresponding to the VTEP information.

It should be noted that a sequence of performing step (7.2) and step (8) is not limited.

By using the configuration methods in FIG. 2, FIG. 3, FIG. 4a, and FIG. 4b, the SDN controller of the first data center acquires, from an SDN controller of a second data center, the IP address and the MAC address of VM7 and VTEP information of a third switch, and sends the IP address and the MAC address of VM7 and the VTEP information of the third switch to the second switch. In this way, the second switch can send the IP packet to VM7 through a tunnel between the second switch and the third switch. That is, the IP packet does not need to pass through a router of data center 1 and does not need to pass through a router of data center 2 either.

(9) The third switch sends the IP packet to VM7 after VxLAN decapsulation is performed.

By means of any of the foregoing processes, communication across data centers and within a same subnet is implemented, and an SDN controller can serve as a proxy to make a reply to a broadcast ARP request sent by a VM, which reduces transmission bandwidth occupied by packet broadcasting. In addition, during communication between VMs, a packet does not need to pass through a router of a first data center and does not need to pass through a router of a second data center either, which alleviates roundabout routing of the packet between the two data centers.

Figure 7A:
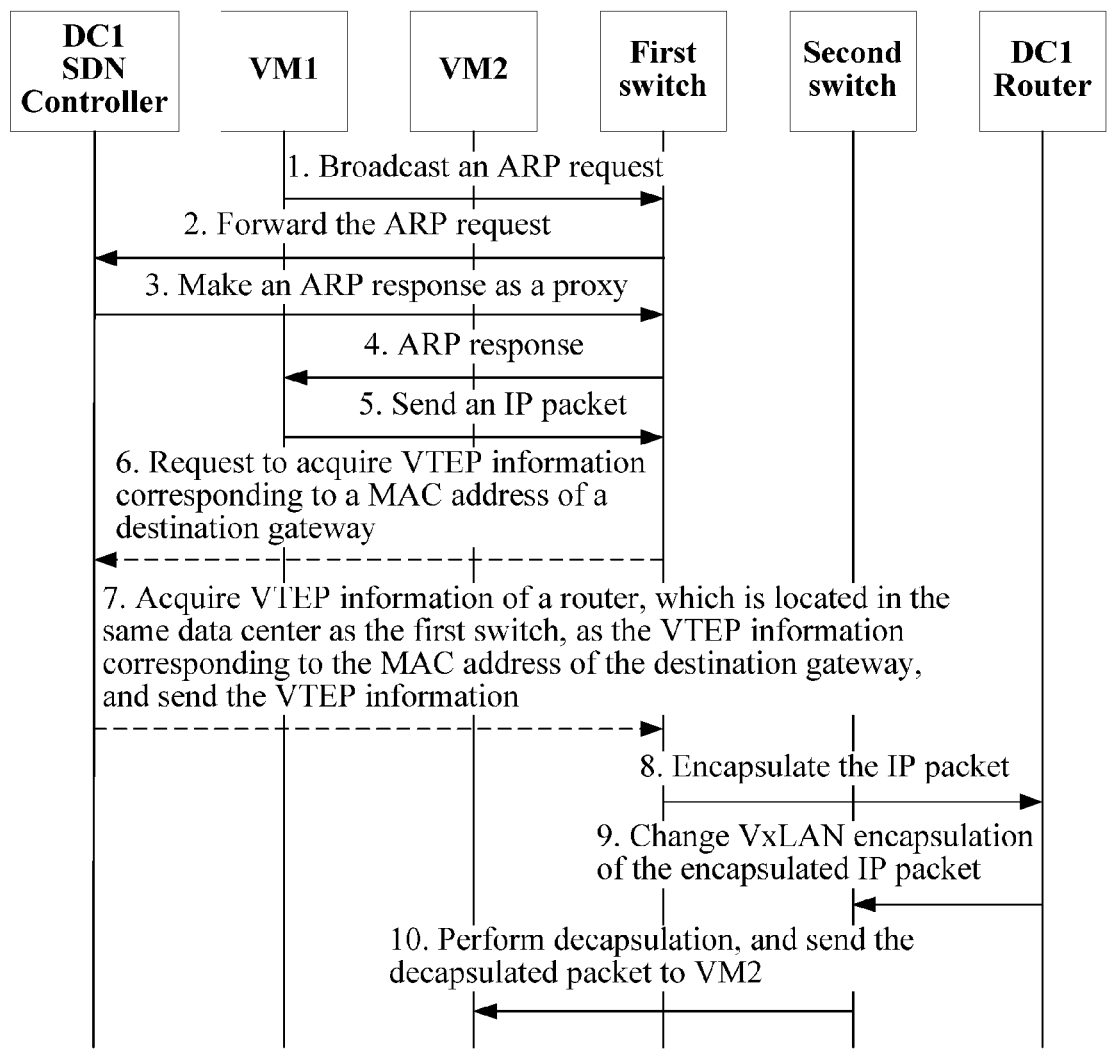
FIG. 7a is a flowchart for implementing communication between VMs according to an embodiment of the present invention.

An embodiment of a method for implementing communication between virtual machines, which is shown in FIG. 7a, is used to implement communication between a virtual machine VM1 located in a data center DC1 and another virtual machine VM2 located in the same data center DC1, where VM1 is located in a first subnet, VM2 is located in a second subnet, and the first subnet and the second subnet are different. VM1 communicates with a VM outside the first subnet by using a first switch, and VM2 communicates with a VM outside the second subnet by using a second switch. The method includes the following steps:

(1) VM1 needs to communicate with VM2. VM1 discovers, by querying a routing table, that VM2 and VM1 are located in different subnets. Then VM1 uses a default gateway 192.168.1.1 of the first subnet as a destination gateway. VM1 sends a broadcast Address Resolution Protocol (ARP) request to the first switch to acquire a MAC address of the destination gateway in a broadcast manner, where the ARP request carries an IP address of the destination gateway.

(2) The first switch receives the ARP request, and forwards the ARP request to an SDN controller of the first data center.

(3) The SDN controller of the first data center receives the ARP request, queries a locally stored flow table according to the IP address of the destination gateway carried in the ARP request, and acquires MAC1 as the MAC address of the destination gateway. The SDN controller sends an ARP response to the first switch, where the ARP response carries the MAC address of the destination gateway, and the ARP response is equivalent to a reply that is made by a proxy to the broadcast ARP request.

Optionally, the ARP request may further carry port information of the first switch that receives the ARP response, the SDN controller queries the flow table according to the port information and obtains a VNI corresponding to the port information, and acquiring the MAC address of the destination gateway specifically includes: acquiring, by the SDN controller, the MAC address of the destination gateway according to the IP address of the destination gateway and the VNI corresponding to the port information. Specifically, the port information may be information about a virtual port, of VM1, on the first switch.

Optionally, the ARP request may further carry a VNI of a port of the first switch that receives the ARP response, and acquiring the MAC address of the destination gateway specifically includes: acquiring, by the SDN controller, the MAC address of the destination gateway according to the IP address of the destination gateway and the VNI of the port of the first switch.

(4) The first switch receives the ARP response, and forwards the ARP response to VM1.

(5) VM1 sends an IP packet to the first switch, where a destination MAC (DestMAC) of the IP packet is MAC1, a destination IP (DestIP) of the IP packet is an IP address of VM2: 192.168.2.2, a source MAC of the IP packet is a MAC of VM1 (which is represented by MAC-VM1), and a source IP of the IP packet is an IP address of VM1: 192.168.1.2.

By means of the configuration processes in FIG. 3, FIG. 4a, and FIG. 4b, the first switch may temporarily store VTEP information corresponding to MAC1. If the first switch discovers that the VTEP information corresponding to MAC1 exists, step (8) is directly performed; if the first switch discovers that no VTEP information corresponding to MAC1 exists, step (6) and step (7) are performed.

(6) The first switch sends a request to the SDN controller of the current data center to request to acquire VTEP information corresponding to the MAC address of the destination gateway.

(7) The SDN controller queries the locally stored flow table, acquires the VTEP information corresponding to the MAC address of the destination gateway, and sends, to the first switch, the VTEP information corresponding to the MAC address of the destination gateway.

When the SDN controller queries the locally stored flow table according to the MAC address of the destination gateway and acquires two or more pieces of VTEP information, VTEP information of a router, which is located in the same data center as the first switch, is used as the VTEP information corresponding to the MAC address of the destination gateway.

In this embodiment, if two pieces of VTEP information, namely, VTEP5 (whose IP is 10.10.10.5) and VTEP6 (whose IP is 11.11.11.6), are acquired according to MAC1, VTEP5 located in the same data center as the first switch is selected as a VTEP corresponding to the MAC address of the destination gateway.

When two or more pieces of VTEP information corresponding to the MAC address of the destination gateway exist in the first data center, as shown in the solution of multiple routers shown in FIG. 1b, the SDN controller selects a suitable VTEP for VM1 according to at least one of the following: load of a router and a scheduling policy, and sends an IP address of the selected suitable VTEP to the first switch. The load of a router includes but is not limited to traffic of the router and CPU load of the router; the scheduling policy includes but is not limited to RondRobin, least load first, and maximum load first.

(8) The first switch acquires the VTEP information corresponding to the MAC address of the destination gateway, performs VxLAN encapsulation on the IP packet received from VM1, and sends the IP packet to a router corresponding to the VTEP information, where a source IP of the IP packet on which the VxLAN encapsulation is performed is an IP address of the first switch, namely, 10.10.10.2, a destination IP of the IP packet on which the VxLAN encapsulation is performed is the acquired VTEP information (10.10.10.5), and a VNI is 11111.

If the first switch discovers, by querying a local flow table, that no VTEP information corresponding to MAC1 exists, the VTEP information corresponding to the MAC address of the destination gateway is acquired by using the foregoing step (6) and step (7), or the first switch acquires, by querying a local flow table, the VTEP information corresponding to the MAC address of the destination gateway. Specifically, when two or more pieces of VTEP information are acquired, VTEP information of a router located in the same data center as the first switch is used as the VTEP information corresponding to the MAC address of the destination gateway. When a same data center has multiple routers, selection is performed according to load of a router and a scheduling policy, which is similar to that in step (7) and is not described in detail again.

(9) The router of the first data center changes the VxLAN encapsulation of the received packet, and sends the packet to the second switch through a tunnel between the router of the first data center and the second switch.

Changing the VxLAN encapsulation is specifically: changing the source IP of the VxLAN encapsulation in step (8) to 10.10.10.5, changing the destination IP of the VxLAN encapsulation in step (8) to an IP address of the second switch, namely, 11.11.11.3, and changing the VNI of the VxLAN encapsulation in step (8) to 22222; and then changing the destination MAC of the IP packet in step (5) to MAC-VM2, and changing the source MAC of the IP packet in step (5) to MAC1. By changing the VxLAN encapsulation, the second switch receives the encapsulated IP packet and directly performs processing without triggering a process of broadcasting an ARP request any more.

(10) The second switch sends the IP packet to VM2 after VxLAN decapsulation is performed.

Figure 7B:
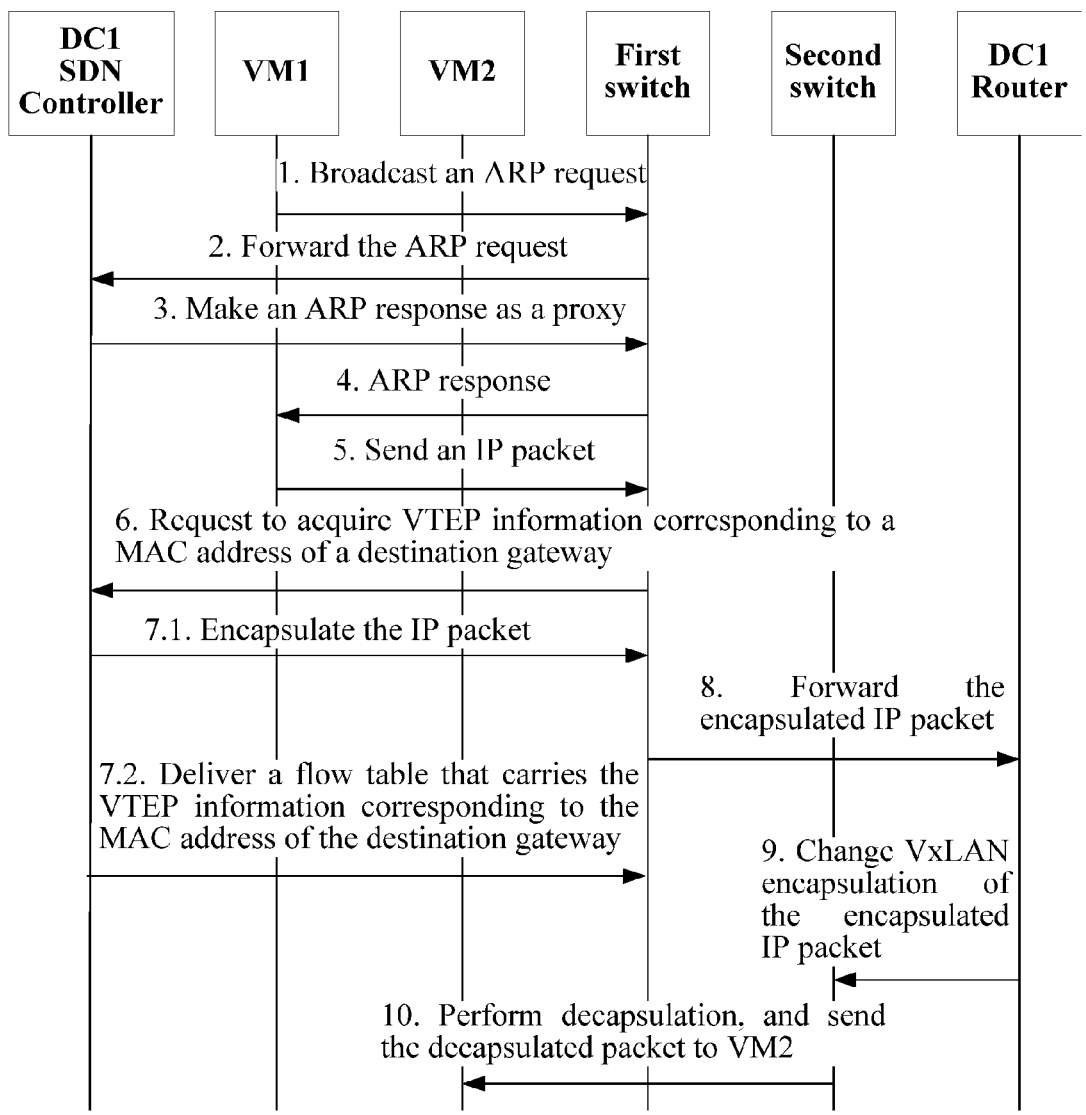
FIG. 7b is a flowchart for implementing communication between VMs according to an embodiment of the present invention.

Refer to an embodiment of a method for implementing communication between virtual machines that is shown in FIG. 7b, where an application scenario is similar to that in the embodiment shown in 7a. The following describes an interaction process in detail.

(1) to (4) are similar to (1) to (4) in the embodiment shown in 7a, and are not described in detail again.

(5) VM1 sends an IP packet to the first switch, where a destination MAC (DestMAC) of the IP packet is MAC1, a destination IP (DestIP) of the IP packet is an IP address of VM2: 192.168.2.2, a source MAC of the IP packet is MAC of VM1 (which is represented by MAC-VM1), and a source IP of the IP packet is an IP address of VM1: 192.168.1.2.

(6) The first switch sends a request to the SDN controller of the current data center to request to acquire VTEP information corresponding to the MAC address of the destination gateway.

(7.1) The SDN controller queries the locally stored flow table and acquires the VTEP information corresponding to the MAC address of the destination gateway; the SDN controller performs VxLAN encapsulation on the IP packet received from the first switch and sends the IP packet to the first switch, where a source IP of the IP packet on which the VxLAN encapsulation is performed is an IP address of the first switch, namely, 10.10.10.2, a destination IP of the IP packet on which the VxLAN encapsulation is performed is the acquired VTEP information (10.10.10.5), and a VNI is 11111.

When the SDN controller queries the locally stored flow table according to the MAC address of the destination gateway and acquires two or more pieces of VTEP information, VTEP information of a router, which is located in the same data center as the first switch, is used as the VTEP information corresponding to the MAC address of the destination gateway.

In this embodiment, if two pieces of VTEP information, namely, VTEP5 (whose IP is 10.10.10.5) and VTEP6 (whose IP is 11.11.11.6), are acquired according to MAC1, VTEP5 located in the same data center as the first switch is selected as a VTEP corresponding to the MAC address of the destination gateway.

When two or more pieces of VTEP information corresponding to the MAC address of the destination gateway exist in the first data center, as shown in the solution of multiple routers shown in FIG. 1b, the SDN controller selects a suitable VTEP for VM4 according to at least one of the following: load of a router and a scheduling policy, and sends an IP address of the selected suitable VTEP to the first switch. The load of a router includes but is not limited to traffic of the router and CPU load of the router; the scheduling policy includes but is not limited to RondRobin, least load first, and maximum load first.

(7.2) In another aspect, the SDN controller sends the VTEP information corresponding to the MAC address of the destination gateway to the first switch in the form of a flow table. When receiving an IP packet subsequently, the first switch may directly forward, according to the VTEP information corresponding to the MAC address of the destination gateway, the subsequently received IP packet on which encapsulation is performed to a router corresponding to the VTEP information, without requesting a flow table from the SDN controller any more.

(8) The first switch receives, from the SDN controller, the IP packet on which the VxLAN encapsulation is performed, and forwards, according to VTEP information in the IP packet on which the VxLAN encapsulation is performed, the IP packet on which the VxLAN encapsulation is performed to the router corresponding to the VTEP information.

It should be noted that a sequence of performing step (7.2) and step (8) is not limited.

(9) and (10) are similar to (9) and (10) in the embodiment shown in 7a, and are not described in detail again.

By means of any of the foregoing processes, communication within a same data center and across subnets is implemented, and an SDN controller can serve as a proxy to make a reply to a broadcast ARP request sent by a VM, which reduces transmission bandwidth occupied by packet broadcasting. In addition, during communication between VMs, unlike the prior art in which a packet may pass through both a router of data center 1 and a router of data center 2, a packet passes only through a router of data center 1, which alleviates roundabout routing of the packet between the data centers; for the solution of multiple routers, elastic scaling among routers can also be implemented.

Passing through a router is not required in communication within a same data center and a same subnet. Using communication between VM2 and VM3 as an example, VM2 sends a packet to a second switch, and then the second switch sends the packet to VM3.

Applications of the embodiments of the present invention in various scenarios are described in the foregoing processes, and certainly these scenarios do not constitute any limitation.

Apparatus in Embodiments of the Present Invention

Figure 8:
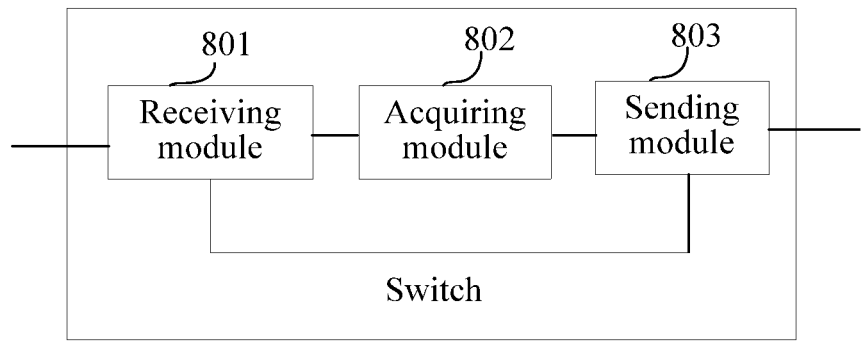
FIG. 8 is a schematic structural diagram of a switch according to an embodiment of the present invention.

As shown in FIG. 8, an embodiment of the present invention provides a first switch for implementing communication between virtual machines, applied to a system including at least a first virtual machine and a second virtual machine, where the first virtual machine is located in a first subnet of a first data center and communicates with the first switch, the second virtual machine is located in a second subnet and communicates with a second switch, and the first switch may be the same as or may be different from the second switch. The first switch includes:

a receiving module 801, configured to receive an Address Resolution Protocol ARP request from the first virtual machine, where the ARP request carries an IP address of a destination gateway;

a sending module 803, configured to forward the ARP request to a software defined network SDN controller of the first data center, where the receiving module 801 is further configured to receive an ARP response from the SDN controller, where the ARP response carries a Media Access Control MAC address of the destination gateway; and an acquiring module 802, configured to acquire, according to the MAC address of the destination gateway, virtual extensible local area network tunnel end point VTEP information corresponding to the MAC address of the destination gateway, where a router corresponding to the VTEP information is located in the first data center, where the sending module 803 is further configured to send, according to the VTEP information, an IP packet to the router corresponding to the VTEP information, so that the router corresponding to the VTEP information sends the IP packet to the second virtual machine through a tunnel between the router and the second switch.

The acquiring module 802 being configured to acquire, according to the MAC address of the destination gateway, VTEP information corresponding to the MAC address of the destination gateway is specifically that:

the acquiring module 802 is configured to send a request to the SDN controller to request to acquire the VTEP information corresponding to the MAC address of the destination gateway, and receive the VTEP information that is sent by the SDN controller and is corresponding to the MAC address of the destination gateway; or the acquiring module 802 being configured to acquire, according to the MAC address of the destination gateway, VTEP information corresponding to the MAC address of the destination gateway is specifically that:

the acquiring module 802 is configured to query, according to the MAC address of the destination gateway, a flow table stored by the first switch, and acquire the VTEP information corresponding to the MAC address of the destination gateway, and when two or more pieces of VTEP information are acquired, use VTEP information of the router located in the first data center as the VTEP information corresponding to the MAC address of the destination gateway.

Figure 9:
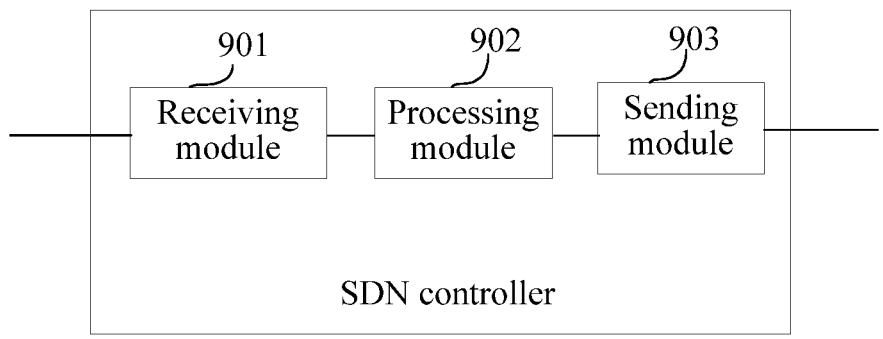
FIG. 9 is a schematic structural diagram of a controller according to an embodiment of the present invention.

As shown in FIG. 9, an embodiment of the present invention provides a software defined network SDN controller for implementing communication between virtual machines, where the SDN controller is located in a first data center and applied to a system including at least a first virtual machine and a second virtual machine, where the first virtual machine is located in a first subnet of the first data center and communicates with a first switch, the second virtual machine is located in a second subnet and communicates with a second switch, and the first switch may be the same as or may be different from the second switch. The SDN controller includes:

a receiving module 901, configured to receive an Address Resolution Protocol ARP request from the first switch, where the ARP request carries an IP address of a destination gateway;

a processing module 902, configured to acquire a Media Access Control MAC address of the destination gateway according to the IP address of the destination gateway; and a sending module 903, configured to send an ARP response to the first switch, where the ARP response carries the MAC address of the destination gateway, so that the first switch acquires, according to the MAC address of the destination gateway, virtual extensible local area network tunnel end point VTEP information corresponding to the MAC address of the destination gateway, where a router corresponding to the VTEP information is located in the first data center, so that the router corresponding to the VTEP information sends an IP packet to the second virtual machine through a tunnel between the router and the second switch.

The receiving module 901 is further configured to receive a request sent by the first switch to request to acquire the VTEP information corresponding to the MAC address of the destination gateway.

The processing module 902 is further configured to: query, according to the MAC address of the destination gateway, a flow table stored by the SDN controller, acquire the VTEP information corresponding to the MAC address of the destination gateway, and return the VTEP information corresponding to the MAC address of the destination gateway to the first switch; and when querying the flow table stored by the SDN controller and acquiring two or more pieces of VTEP information, use VTEP information of the router located in the first data center as the VTEP information corresponding to the MAC address of the destination gateway. When the processing module 902 queries, according to the MAC address of the destination gateway, the flow table stored by the SDN controller and acquires two or more pieces of VTEP information of routers located in the first data center, the processing module 902 selects the VTEP information corresponding to the MAC address of the destination gateway according to at least one of the following: load of a router and a scheduling policy.

If the second virtual machine is located in a second data center, the processing module 902 is further configured to acquire, from an SDN controller of the second data center, an IP address and a MAC address of the second virtual machine, a VNI of the second subnet, and VTEP information of the second switch.

The switch provided in FIG. 8 and the SDN controller provided in FIG. 9 according to the embodiments of the present invention can be used to execute the configuration processes in FIG. 2, FIG. 3, FIG. 4a, and FIG. 4b, and are used to execute the methods shown in FIG. 5a, FIG. 5b, FIG. 7a, and FIG. 7b. For specific processes, refer to descriptions of the system embodiments and the method embodiments, and details are not described again.

The switch provided in FIG. 8 and the SDN controller provided in FIG. 9 according to the embodiments of the present invention can implement communication across subnets, and the SDN controller can serve as a proxy to make a reply to a broadcast ARP request sent by a VM, which reduces transmission bandwidth occupied by packet broadcasting. In addition, during communication between VMs, instead of passing through both a router of data center 1 and a router of data center 2, a packet passes only through a router of data center 1, which alleviates roundabout routing of the packet between the data centers.

Figure 10:
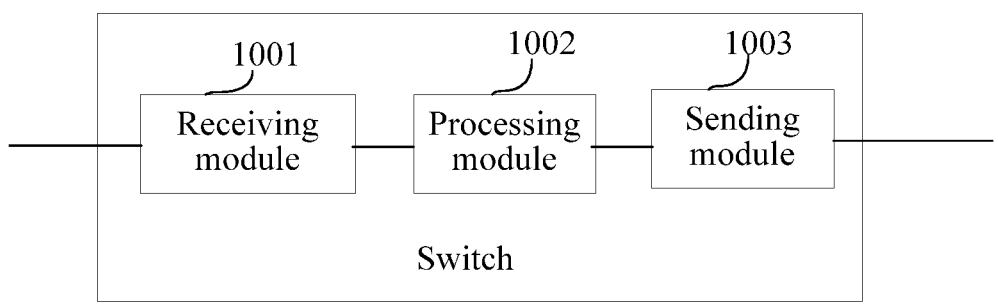
FIG. 10 is a schematic structural diagram of a switch according to an embodiment of the present invention.

As shown in FIG. 10, an embodiment of the present invention provides a first switch for implementing communication between virtual machines, applied to a system including at least a first virtual machine and a second virtual machine, where the first virtual machine is located in a first data center and communicates with the first switch, the second virtual machine is located in a second data center and communicates with a second switch, the first virtual machine and the second virtual machine are located in a same subnet, and the first switch may be the same as or may be different from the second switch. The first switch includes:

a receiving module 1001, configured to receive an Address Resolution Protocol ARP request from the first virtual machine, where the ARP request carries an IP address of a destination virtual machine;

a processing module 1002, configured to acquire a Media Access Control MAC address of the destination virtual machine according to the IP address of the destination virtual machine, and acquire, according to the MAC address of the destination virtual machine, virtual extensible local area network tunnel end point VTEP information corresponding to the MAC address of the destination virtual machine, where the VTEP information is an IP address of the second switch; and a sending module 1003, configured to send an IP packet to the second virtual machine through a tunnel between the first switch and the second switch.

The processing module 1002 being configured to acquire a MAC address of the destination virtual machine according to the IP address of the destination virtual machine is specifically: forwarding the ARP request to a software defined network SDN controller of the first data center, where the ARP request carries the IP address of the destination virtual machine; and receiving an ARP response from the SDN controller, where the ARP response carries the MAC address of the destination virtual machine.

The processing module 1002 being configured to acquire, according to the MAC address of the destination virtual machine, VTEP information corresponding to the MAC address of the destination virtual machine is specifically that the processing module 1002 is configured to send a request to the SDN controller to request to acquire the VTEP information corresponding to the MAC address of the destination virtual machine, and receive the VTEP information that is sent by the SDN controller and is corresponding to the MAC address of the destination virtual machine; or the processing module 1002 is configured to query, according to the MAC address of the destination virtual machine, a flow table stored by the first switch, and acquire the VTEP information corresponding to the MAC address of the destination virtual machine.

The processing module 1002 is further configured to acquire, from the SDN controller of the first data center, an IP address and a MAC address of the second virtual machine, and VTEP information of the second switch.

Figure 11:
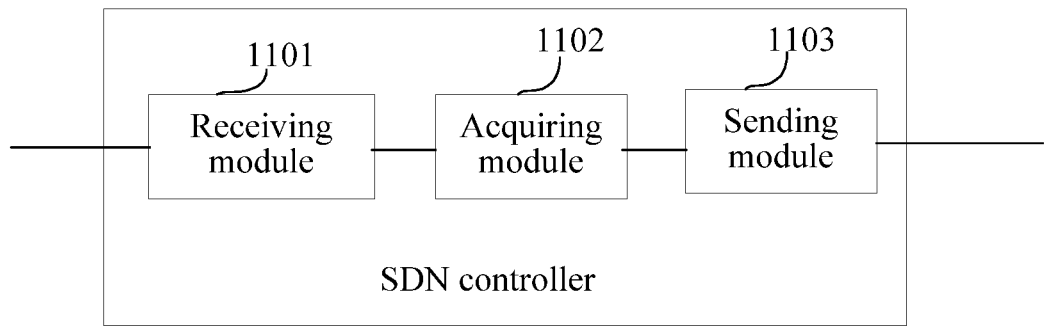
FIG. 11 is a schematic structural diagram of a controller according to an embodiment of the present invention.

As shown in FIG. 11, an embodiment of the present invention provides a software defined network SDN controller for implementing communication between virtual machines, where the SDN controller is located in a first data center and applied to a system including at least a first virtual machine and a second virtual machine, where the first virtual machine is located in the first data center and communicates with a first switch, the second virtual machine is located in a second data center and communicates with a second switch, the first virtual machine and the second virtual machine are located in a same subnet, and the first switch may be the same as or may be different from the second switch. The SDN controller includes:

a receiving module 1101, configured to receive an Address Resolution Protocol ARP request from the first switch, where the ARP request carries an IP address of a destination virtual machine;

an acquiring module 1102, configured to acquire a Media Access Control MAC address of the destination virtual machine according to the IP address of the destination virtual machine; and a sending module 1103, configured to send an ARP response to the first switch, where the ARP response carries the MAC address of the destination virtual machine, so that the first switch acquires, according to the MAC address of the destination virtual machine, virtual extensible local area network tunnel end point VTEP information corresponding to the MAC address of the destination virtual machine, where the VTEP information is an IP address of the second switch, so that the first switch sends an IP packet to the second virtual machine through a tunnel between the first switch and the second switch.

The receiving module 1101 is further configured to receive a request sent by the first switch to request to acquire the VTEP information corresponding to the MAC address of the destination virtual machine; and the acquiring module 1102 is further configured to query, according to the MAC address of the destination virtual machine, a flow table stored by the SDN controller, acquire the VTEP information corresponding to the MAC address of the destination virtual machine, and return the VTEP information corresponding to the MAC address of the destination virtual machine to the first switch.

The acquiring module 1102 is further configured to acquire, from an SDN controller of the second data center, an IP address and a MAC address of the second virtual machine, and VTEP information of the second switch; and the sending module 1103 is further configured to send the IP address and the MAC address of the second virtual machine, and the VTEP information of the second switch to the first switch.

The switch provided in FIG. 10 and the SDN controller provided in FIG. 11 according to the embodiments of the present invention can be used to execute the configuration processes in FIG. 2, FIG. 3, FIG. 4a, and FIG. 4b, and are used to execute the methods shown in FIG. 6a and FIG. 6b. For specific processes, refer to descriptions of the system embodiments and the method embodiments, and details are not described again.

The switch provided in FIG. 10 and the SDN controller provided in FIG. 11 according to the embodiments of the present invention can implement communication across data centers and within a same subnet, and the SDN controller can serve as a proxy to make a reply to a broadcast ARP request sent by a VM, which reduces transmission bandwidth occupied by packet broadcasting. In addition, during communication between VMs, a packet does not need to pass through a router of data center 1 and does not need to pass through a router of data center 2 either, which alleviates roundabout routing of the packet between the two data centers.

Figure 12:
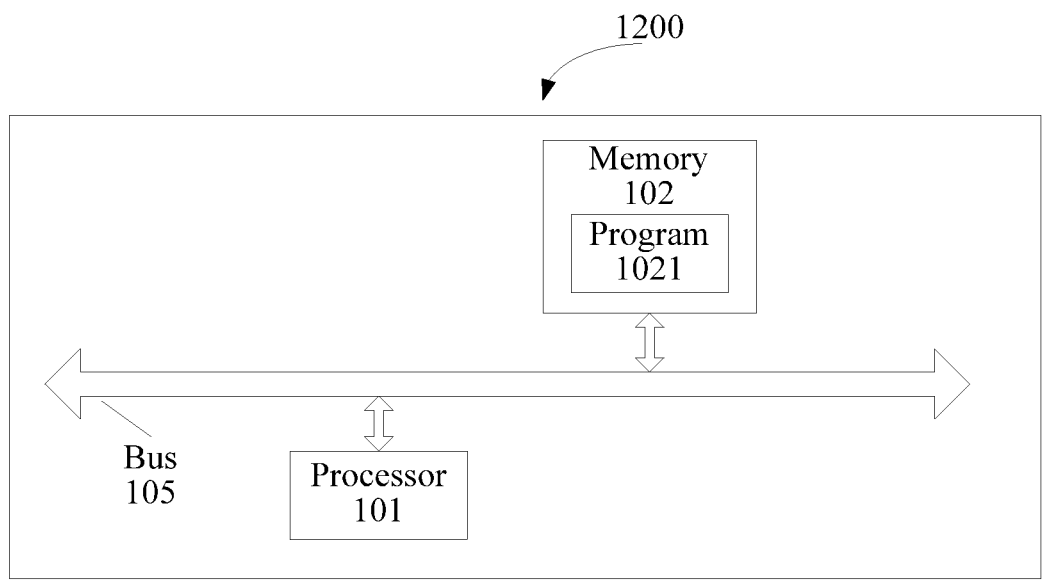
FIG. 12 is a schematic structural diagram of hardware according to an embodiment of the present invention.

Another apparatus 1200 in FIG. 12 is provided for implementing communication between virtual machines according to an embodiment of the present invention, including:

a processor 101, a memory 102, and a system bus (bus for short) 105, where the processor 101 and the memory 102 are connected and complete communication with each other by using the system bus 105.

The processor 101 may be a single-core or a multi-core central processing unit, a specific integrated circuit, or one or more integrated circuits configured to implement the embodiments of the present invention.

The memory 102 may be a high-speed RAM memory, or may be a non-volatile memory, for example, at least one hard disk memory.

The memory 102 is configured to store a computer-executable instruction 1021, and specifically, the computer-executable instruction 1021 may include program code.

When a computer runs, the processor 101 runs the computer-executable instruction 1021, and any one of the processes in FIG. 2 to FIG. 7b can be executed.

An embodiment of the present invention further provides a computer program product for communication between virtual machines, including a computer-readable storage medium that stores program code, where an instruction included in the program code is used to execute any one of the processes in FIG. 2 to FIG. 7b.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

What is claimed is:

1. A method for implementing communication between virtual machines, applied to a system comprising at least a first virtual machine and a second virtual machine, wherein the first virtual machine is located in a first subnet and communicates with a first switch, and the second virtual machine is located in a second subnet and communicates with a second switch, comprising:
   receiving, by a software defined network (SDN) controller, an Address Resolution Protocol (ARP) request from the first switch, wherein the ARP request carries an IP address of a destination gateway;
   obtaining, by the SDN controller, a Media Access Control (MAC) address of the destination gateway according to the IP address of the destination gateway;
   obtaining, by the SDN controller, virtual extensible local area network tunnel end point (VTEP) addresses corresponding to the MAC address, wherein the VTEP addresses identify a plurality of routers in the system;
   selecting, by the SDN controller, from the plurality of routers, a first router for transmitting an IP packet from the first virtual machine to the second virtual machine through a tunnel between the first router and the second switch connected to the second virtual machine; and
   sending, by the SDN controller, a VTEP address of the first router to the first switch.

2. The method according to claim 1, the method further comprising:
   receiving, by the SDN controller, a request sent by the first switch to request to obtain the VTEP addresses corresponding to the MAC address of the destination gateway; and
   wherein the step of obtaining the VTEP addresses comprising: querying, by the SDN controller, a locally stored flow table, obtaining the VTEP addresses corresponding to the MAC address of the destination gateway.

3. The method according to claim 1, if the first switch communicates with a second router, wherein the step of selecting comprising:
   obtaining, by the SDN controller, from the plurality of routers, the first router and the second router; and
   selecting, by the SDN controller, the first router for transmitting the IP packet from the first virtual machine to the second virtual machine according to at least one of the following: loads of the first router and the second router, and a scheduling policy.

4. The method according to claim 1, wherein the method further comprises:
   receiving, by the first switch, the IP packet from the first virtual machine;
   performing, by the first switch, virtual extensible local area network (VxLAN) encapsulation on the IP packet, wherein a destination IP address of the VxLAN encapsulation is the VTEP address of the first router, a virtual network identifier (VNI) is an identifier of the first subnet, and a destination MAC address of the VxLAN encapsulation is the MAC address of the destination gateway; and
   sending, by the first switch, the VxLAN encapsulation packet to the first router.

5. The method according to claim 4, wherein the method further comprises:
   receiving, by the first router, the VxLAN encapsulation packet;
   changing, by the first router, the destination IP address to an IP address of the second switch, the VNI to an identifier of the second subnet, and the destination MAC address to a MAC address of the second virtual machine; and
   sending, by the first router, the changed VxLAN encapsulation packet to the second switch through the tunnel between the first router and the second switch connected to the second virtual machine.

6. A software defined network (SDN) controller for implementing communication between virtual machines, wherein the SDN controller is applied to a system comprising at least a first virtual machine and a second virtual machine, wherein the first virtual machine is located in a first subnet and communicates with a first switch, and the second virtual machine is located in a second subnet and communicates with a second switch, the SDN controller comprising:
   a processor, a memory, and a system bus, wherein: the processor and the memory are connected and complete communication with each other by using the system bus;
   the memory is configured to store a computer-executable instruction; and
   the processor is configured to run the computer-executable instruction to execute:
   receiving an Address Resolution Protocol (ARP) request from the first switch, wherein the ARP request carries an IP address of a destination gateway;
   obtaining a Media Access Control (MAC) address of the destination gateway according to the IP address of the destination gateway;
   obtaining virtual extensible local area network tunnel end point (VTEP) addresses corresponding to the MAC address, wherein the VTEP addresses identify a plurality of routers in the system;
   selecting from the plurality of routers, a first router for transmitting an IP packet from the first virtual machine to the second virtual machine through a tunnel between the first router and the second switch connected to the second virtual machine; and
   sending a VTEP address of the first router to the first switch.

7. The SDN controller according to claim 6, the processor is further configured to run the computer-executable instruction to execute:
   receiving a request sent by the first switch to request to obtain the VTEP addresses corresponding to the MAC address of the destination gateway; and
   querying a locally stored flow table, obtaining the VTEP addresses corresponding to the MAC address of the destination gateway.

8. The SDN controller according to claim 6, if the first switch communicates with a second router, wherein the processor is configured to run the computer-executable instruction to execute the step of selecting comprises:

obtaining from the plurality of routers, the first router and the second router; and selecting the first router for transmitting the IP packet from the first virtual machine to the second virtual machine according to at least one of the following: loads of the first router and the second router, and a scheduling policy.

9. A method for implementing communication between virtual machines, applied to a system comprising at least a first virtual machine and a second virtual machine, wherein the first virtual machine is located in a first subnet and communicates with a first switch, and the second virtual machine is located in a second subnet and communicates with a second switch, comprising:

receiving, by the first switch, an Address Resolution Protocol (ARP) request from the first virtual machine, wherein the ARP request carries an IP address of a destination gateway;

sending, by the first switch, the ARP request to a software defined network (SDN) controller;

obtaining, by the first switch, virtual extensible local area network tunnel end point (VTEP) addresses corresponding to a Media Access Control (MAC) address of the destination gateway, wherein the VTEP addresses identify a plurality of routers in the system; and selecting, by the first switch, from the plurality of routers, a first router for transmitting an IP packet from the first virtual machine to the second virtual machine through a tunnel between the first router and the second switch connected to the second virtual machine.

10. The method according to claim 9, wherein the step of obtaining the VTEP addresses comprising: querying, by the first switch, a locally stored flow table, obtaining the VTEP addresses corresponding to the MAC address of the destination gateway.

11. The method according to claim 9, if the first switch communicates with a second router, wherein the step of selecting comprising:

obtaining, by the first switch, from the plurality of routers, the first router and the second router; and selecting, by the first switch, the first router for transmitting the IP packet from the first virtual machine to the second virtual machine according to at least one of the following: loads of the first router and the second router, and a scheduling policy.

12. The method according to claim 9, wherein the method further comprises:

receiving, by the first switch, the IP packet from the first virtual machine;

performing, by the first switch, virtual extensible local area network (VxLAN) encapsulation on the IP packet, wherein a destination IP address of the VxLAN encapsulation is a VTEP address of the first router, a virtual network identifier (VNI) is an identifier of the first subnet, and a destination MAC address of the VxLAN encapsulation is the MAC address of the destination gateway; and sending, by the first switch, the VxLAN encapsulation packet to the first router.

13. The method according to claim 12, wherein the method further comprises:

receiving, by the first router, the VxLAN encapsulation packet;

changing, by the first router, the destination IP address to an IP address of the second switch, the VNI to an identifier of the second subnet, and the destination MAC address to a MAC address of the second virtual machine; and sending, by the first router, the changed VxLAN encapsulation packet to the second switch through the tunnel between the first router and the second switch connected to the second virtual machine.

14. A first switch for implementing communication between virtual machines, wherein the first switch is applied to a system comprising at least a first virtual machine and a second virtual machine, wherein the first virtual machine is located in a first subnet and communicates with the first switch, and the second virtual machine is located in a second subnet and communicates with a second switch, the first switch comprising:

a processor, a memory, and a system bus, wherein: the processor and the memory are connected and complete communication with each other by using the system bus;

the memory is configured to store a computer-executable instruction; and the processor is configured to run the computer-executable instruction to execute:

receiving an Address Resolution Protocol (ARP) request from the first virtual machine, wherein the ARP request carries an IP address of a destination gateway;

sending the ARP request to a software defined network (SDN) controller;

obtaining virtual extensible local area network tunnel end point (VTEP) addresses corresponding to a Media Access Control (MAC) address of the destination gateway, wherein the VTEP addresses identify a plurality of routers in the system; and selecting from the plurality of routers, a first router for transmitting an IP packet from the first virtual machine to the second virtual machine through a tunnel between the first router and the second switch connected to the second virtual machine.

15. The first switch according to 14, the processor is configured to run the computer-executable instruction to execute: querying a locally stored flow table, obtaining the VTEP addresses corresponding to the MAC address of the destination gateway.

16. The first switch according to 14, if the first switch communicates with a second, wherein the processor is configured to run the computer-executable instruction to execute:

obtaining from the plurality of routers, the first router and the second router; and selecting the first router for transmitting the IP packet from the first virtual machine to the second virtual machine according to at least one of the following: loads of the first router and the second router, and a scheduling policy.

17. The first switch according to 14, wherein the processor is further configured to run the computer-executable instruction to execute:

receiving the IP packet from the first virtual machine;

performing virtual extensible local area network (Vx-LAN) encapsulation on the IP packet, wherein a destination IP address of the VxLAN encapsulation is a VTEP address of the first router, a virtual network identifier (VNI) is an identifier of the first subnet, and a destination MAC address of the VxLAN encapsulation is the MAC address of the destination gateway; and sending the VxLAN encapsulation packet to the first router.

* * * * *